United States Patent
Lou

(10) Patent No.: US 11,467,305 B2
(45) Date of Patent: Oct. 11, 2022

(54) ANISOTROPIC NMO CORRECTION AND ITS APPLICATION TO ATTENUATE NOISES IN VSP DATA

(71) Applicant: Min Lou, Houston, TX (US)

(72) Inventor: Min Lou, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 441 days.

(21) Appl. No.: 16/002,622

(22) Filed: Jun. 7, 2018

(65) Prior Publication Data

US 2018/0356549 A1 Dec. 13, 2018

Related U.S. Application Data

(60) Provisional application No. 62/517,450, filed on Jun. 9, 2017.

(51) Int. Cl.
*G01V 1/36* (2006.01)
*E21B 7/04* (2006.01)
(Continued)

(52) U.S. Cl.
CPC .............. *G01V 1/362* (2013.01); *E21B 49/00* (2013.01); *G01V 1/364* (2013.01); *G01V 1/42* (2013.01);
(Continued)

(58) Field of Classification Search
CPC .......... G01V 1/362; G01V 1/364; G01V 1/42; G01V 1/34; G01V 2210/1293; G01V 2210/1295; G01V 2210/1429; G01V 2210/161; G01V 2210/324; G01V 2210/3246; G01V 2210/3248;
(Continued)

(56) References Cited

U.S. PATENT DOCUMENTS 542,069 A * 10/1895 Tackaberry .............. G01V 1/36
367/38
4,894,809 A * 1/1990 Moeckel ................ G01V 1/362
367/51
(Continued)

OTHER PUBLICATIONS

M. Lou (Baker Hughes Inc) & F. Doherty (Baker Hughes Inc), A Methodology to Estimate Residual Source Statics from 2D/3D VSP Data (Year: 2014).*
(Continued)

*Primary Examiner* — Rehana Perveen
*Assistant Examiner* — Nupur Debnath
(74) *Attorney, Agent, or Firm* — Cantor Colburn LLP

(57) ABSTRACT

A method for performing a formation-related operation based on corrected vertical seismic profile (VSP) data of an earth formation includes performing a VSP survey and applying a normal moveout (NMO) correction equation to the survey data that is a function of source offset to wellhead. The method also includes solving the NMO correction equation using a simulated annealing algorithm having an object function that is a coherence coefficient of semblance analysis of an NMO corrected reflection event within a time window to provide NMO corrected data. The method further includes performing the formation-related operation at at least one of a location, a depth and a depth interval based on the VSP NMO corrected data.

11 Claims, 18 Drawing Sheets

(51) Int. Cl.
  *E21B 43/11*  (2006.01)
  *E21B 43/26*  (2006.01)
  *E21B 49/00*  (2006.01)
  *G01V 1/42*  (2006.01)
  *G01V 1/34*  (2006.01)

(52) U.S. Cl.
  CPC .................. *E21B 7/04* (2013.01); *E21B 43/11* (2013.01); *E21B 43/26* (2013.01); *G01V 1/34* (2013.01); *G01V 2210/1293* (2013.01); *G01V 2210/1295* (2013.01); *G01V 2210/1429* (2013.01); *G01V 2210/161* (2013.01); *G01V 2210/324* (2013.01); *G01V 2210/3246* (2013.01); *G01V 2210/3248* (2013.01); *G01V 2210/52* (2013.01); *G01V 2210/586* (2013.01)

(58) Field of Classification Search
  CPC .......... G01V 2210/52; G01V 2210/586; E21B 49/00; E21B 7/04; E21B 43/11; E21B 43/26
  See application file for complete search history.

(56) References Cited

U.S. PATENT DOCUMENTS

| | | | |
|---|---|---|---|
| 5,500,832 A * | 3/1996 | Berryhill | G01V 1/301 367/50 |
| 5,978,314 A * | 11/1999 | Pham | G01V 1/303 367/38 |
| 5,982,706 A * | 11/1999 | Byun | G01V 1/362 367/21 |
| 6,128,580 A | 10/2000 | Thomsen | |
| 6,864,890 B2 | 3/2005 | Meek et al. | |
| 6,904,368 B2 | 6/2005 | Reshef et al. | |
| 6,917,564 B2 | 7/2005 | Leaney | |
| 6,967,898 B2 | 11/2005 | Leaney | |
| 7,359,284 B2 | 4/2008 | Fuller et al. | |
| 7,889,599 B2 * | 2/2011 | Siliqi | G01V 1/36 367/52 |
| 8,395,967 B2 | 3/2013 | Lou et al. | |
| 8,407,007 B2 | 3/2013 | Blias | |
| 8,659,974 B2 | 2/2014 | Roberts et al. | |
| 8,750,074 B2 | 6/2014 | Blias | |
| 9,316,757 B2 | 4/2016 | Bansal et al. | |
| 10,267,937 B2 * | 4/2019 | Hu | G01V 1/362 |
| 2002/0141287 A1 | 10/2002 | Lazaratos | |
| 2004/0008578 A1 | 1/2004 | Leaney | |
| 2004/0190375 A1 * | 9/2004 | MacKay | G01V 1/362 367/52 |
| 2005/0174886 A1 * | 8/2005 | Fuller | G01V 1/42 367/57 |
| 2012/0095690 A1 * | 4/2012 | Higginbotham | G01V 1/28 702/18 |
| 2014/0293475 A1 | 10/2014 | Degawa et al. | |
| 2015/0316671 A1 * | 11/2015 | Willis | G01V 1/303 367/25 |
| 2016/0061976 A1 | 3/2016 | Hu | |
| 2016/0356909 A1 | 12/2016 | Zhou | |

OTHER PUBLICATIONS

Handbook of Geophysical Exploration: Seismic Exploration (Year: 2001).*
Sverre Planke, (http://www.image-fp7.fr/reference-documents/deliverables/IMAGE-D4.02-v2016.05.01-VSP-Final-Report-public.pdf (Year: 2016).*
Mary L. Krasovec, https://core.ac.uk/download/pdf/4423978.pdf (Year: 2001).*
Alkhalifah, T.; "Velocity Analysis Using Nonhyperbolic Moveout in Transversely Isotropic Media"; Geophysics vol. 62. No. 6; Nov.-Dec. 1997; p. 1839-1854.
Fomel, et al.; "Generalized Nonhyperbolic Moveout Approximation"; Geophysics, vol. 75, No. 2; Mar.-Apr. 2010; 10 pages.
International Search Report; PCT/US2018/036583; dated Sep. 28, 2018; 3 pages.
Leaney, et al.; "Analysis of Multiazimuthal VSP Data for Anisotropy and AVO"; Geophysics, vol. 64, No. 4; Jul.-Aug. 1999; 9 pages.
Lou, et al.; "A Methodology to Estimate Residual Source Statics from 2D/3D VSP Data"; Jun. 2014; 76th EAGE Conference & Exhibition; Amsterdam RAI, The Netherlands; 5 pages.
Lou, et al.; "Anisiotropic Parameter Estimation from Joint P- and C-Wave Data"; SEG Int'l Exposition and 72nd Annual Meeting; Utah; Oct. 6-11, 2002; 4 pages.
Ma, Xin-Quan; "Simultaneous Inversion of Prestack Seismic Data for Rock Properties Using Simulated Annealing"; GeoPhysics, vol. 67. No. 6; Nov.-Dec. 2002; 9 pages.
Owusu; et al.; "VSP Normal Moveout Stretch"; Geophysics, vol. 60, No. 5; Sep.-Oct. 1995; 4 pages.
Thomsen, Leon; "Weak Elastic Anisotropy"; Oct. 1986; Geophysics, vol. 51. No. 10; p. 1954-1966.
Written Opinion of the International Searching Authority; PCT/US2018/036583; dated Sep. 28, 2018; 5 pages.

* cited by examiner

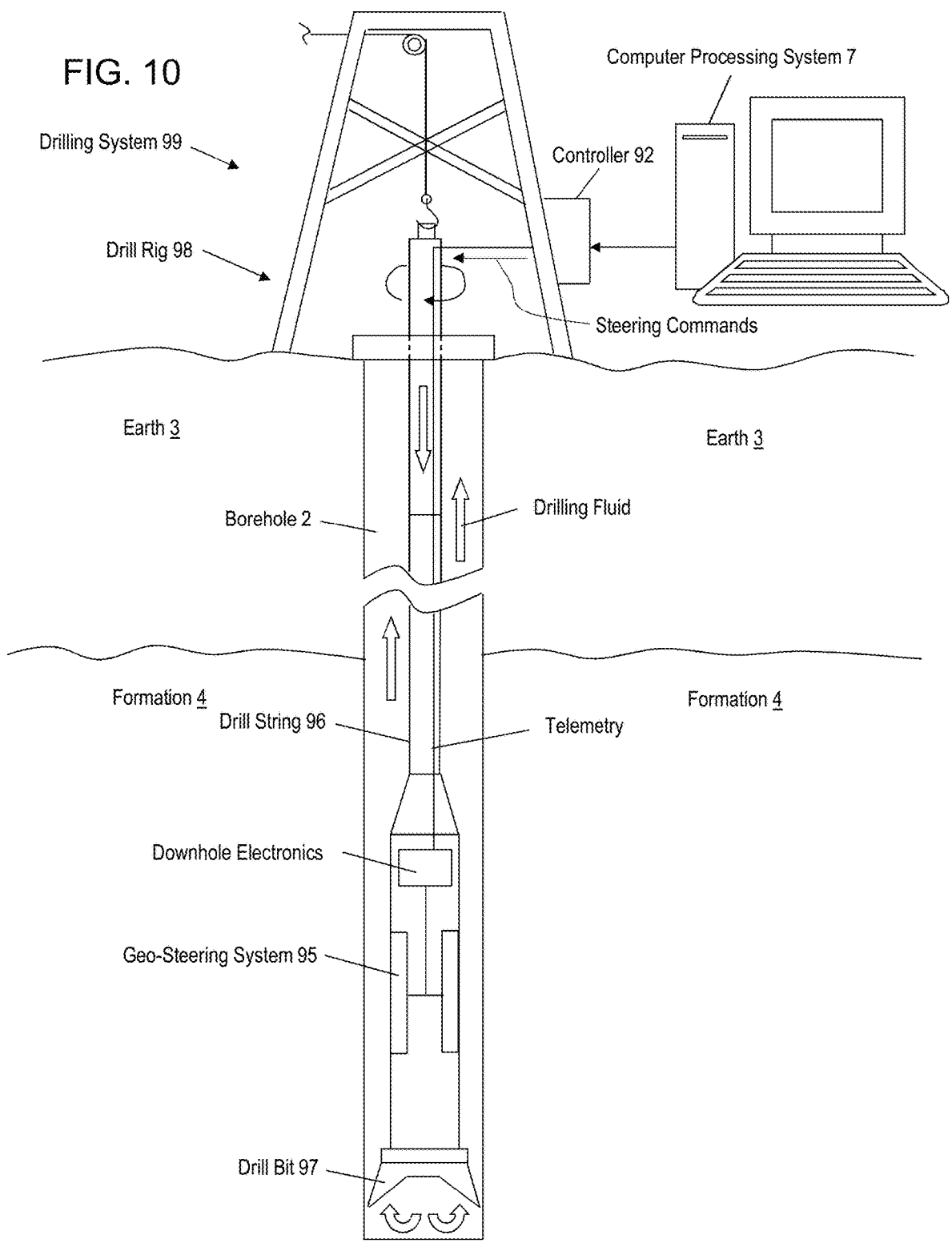

ANISOTROPIC NMO CORRECTION AND ITS APPLICATION TO ATTENUATE NOISES IN VSP DATA

CROSS REFERENCE TO RELATED APPLICATIONS

This application claims the benefit of an earlier filing date from U.S. Provisional Application Ser. No. 62/517,450 filed Jun. 9, 2017, the entire disclosure of which is incorporated herein by reference.

BACKGROUND

Vertical seismic profiling provides a detailed survey of material subsurface to the earth such as geologic formations. Using a vertical seismic profile, engineers and analysts can plan actions going forward to make efficient use of equipment for utilizing the formations. For example, borehole locations and their trajectories and completion actions can be determined using the vertical seismic profile. Hence, it would be appreciated in the drilling and production industries if methods and apparatuses were developed that could improve the accuracy and clarity of vertical seismic profiles.

BRIEF SUMMARY

Disclosed is A method for performing a formation-related operation based on corrected vertical seismic profile (VSP) data of an earth formation. The method includes performing a VSP survey using a seismic data acquisition system to provide VSP data; applying, with a processor, a normal moveout (NMO) correction equation to the VSP data, the NMO correction equation having a form of:

$$t^2(x) = t_0^2 + \frac{x^2}{V^2} + \frac{Ax^4}{V^4\left(t_0^2 + B\frac{x^2}{V^2} + \sqrt{t_0^4 + 2Bt_0^2\frac{x^2}{V^2} + C\frac{x^4}{V^4}}\right)}$$

where t is time, x is source offset $t_0$ wellhead, $t_0$ is one-way zero-offset vertical reflection time to a borehole receiver from a reflector, V is effective NMO velocity, and A, B, and C are coefficients; solving, with the processor, the NMO correction equation by using a simulated annealing (SA) algorithm to provide VSP NMO corrected data, the SA algorithm comprising a coherence coefficient of semblance analysis of an NMO corrected reflection event within a time window, the coherence coefficient of semblance analysis being within a selected range of a maximum value, the coherence coefficient of semblance analysis (CE) comprising a form of:

$$CE = \frac{1}{M} \frac{\sum_{t}^{T}\left(\sum_{i=1}^{M} f_{i,t(i)}\right)^2}{\sum_{t}^{T}\sum_{i=1}^{M} f_{i,t(i)}^2}$$

where $f_{i,t(i)}$ is an amplitude value on the $i^{th}$ trace at NMO corrected time t(i), M is a number of traces in a common receiver gather, and T is a window length of semblance analysis; and performing the formation-related operation at at least one of a location, a depth and a depth interval based on the VSP NMO corrected data.

Also disclosed is A method for performing a formation-related operation based on corrected vertical seismic profile (VSP) data of an earth formation. The method includes: performing a VSP survey using a seismic data acquisition system to provide VSP data; applying, with a processor, a normal moveout (NMO) correction equation to the VSP data, the NMO correction equation comprising a form of:

$$t^2(x) = t_0^2 + \frac{x^2}{V^2} + \frac{Ax^4}{V^4\left(t_0^2 + B\frac{x^2}{V^2} + \sqrt{t_0^4 + 2Bt_0^2\frac{x^2}{V^2} + C\frac{x^4}{V^4}}\right)}$$

where t is time, x is source offset to wellhead, $t_0$ is one-way zero-offset vertical reflection time to a borehole receiver from a reflector, V is effective NMO velocity, and A, B, and C are coefficients; solving, with the processor, the NMO correction equation by using a simulated annealing (SA) algorithm to provide VSP NMO corrected data, the SA algorithm comprising a coherence coefficient of semblance analysis of an NMO corrected reflection event within a time window, the coherence coefficient of semblance analysis being within a selected range of a maximum value, the coherence coefficient of semblance analysis (CE) comprising a form of:

$$CE = \frac{1}{M} \frac{\sum_{t}^{T}\left(\sum_{i=1}^{M} f_{i,t(i)}\right)^2}{\sum_{t}^{T}\sum_{i=1}^{M} f_{i,t(i)}^2}$$

where $f_{i,t(i)}$ is an amplitude value on the $i^{th}$ trace at NMO corrected time t(i), M is a number of traces in a common receiver gather, and T is a window length of semblance analysis; applying, with the processor, a median filter to the VSP NMO corrected data to provide median-filtered VSP NMO corrected data that attenuates unaligned noises; and performing the formation-related operation at at least one of a location, a depth and a depth interval based on the median-filtered VSP NMO corrected data.

Further disclosed is a method for performing a formation-related operation based on corrected vertical seismic profile (VSP) data of an earth formation. The method includes: performing a VSP survey using a seismic data acquisition system to provide VSP data; applying, with a processor, a normal moveout (NMO) correction equation to the VSP data, the NMO correction equation comprising a form of:

$$t^2(x) = t_0^2 + \frac{x^2}{V^2} + \frac{Ax^4}{V^4\left(t_0^2 + B\frac{x^2}{V^2} + \sqrt{t_0^4 + 2Bt_0^2\frac{x^2}{V^2} + C\frac{x^4}{V^4}}\right)}$$

where t is time, x is source offset to wellhead, $t_0$ is one-way zero-offset vertical reflection time to a borehole receiver from a reflector, V is effective NMO velocity, and A, B, and C are coefficients; solving, with the processor, the NMO correction equation by using a simulated annealing (SA) algorithm to provide VSP NMO corrected data, the SA algorithm comprising a coherence coefficient of semblance analysis of an NMO corrected reflection event within a time window, the coherence coefficient of semblance analysis being within a selected range of a maximum value, the coherence coefficient of semblance analysis (CE) comprising a form of:

$$CE = \frac{1}{M} \frac{\sum_{t}^{T} \left( \sum_{i=1}^{M} f_{i,t(i)} \right)^2}{\sum_{t}^{T} \sum_{i=1}^{M} f_{i,t(i)}^2}$$

where $f_{i,t(i)}$ is an amplitude value on the $i^{th}$ trace at NMO corrected time t(i), M is a number of traces in a common receiver gather, and T is a window length of semblance analysis; applying, with the processor, a median filter to the VSP NMO corrected data to provide median-filtered VSP NMO corrected data that attenuates unaligned noises; applying, with the processor, a reverse NMO algorithm to the median-filtered VSP NMO corrected data to provide reverse median-filtered VSP NMO corrected data; and performing the formation-related operation at at least one of a location, a depth and a depth interval based on the reverse median-filtered VSP NMO corrected data.

BRIEF DESCRIPTION OF THE DRAWINGS

The following descriptions should not be considered limiting in any way. With reference to the accompanying drawings, like elements are numbered alike:

FIG. 10 depicts aspects of a drilling system for drilling a borehole in accordance with images having the disclosed NMO correction.

DETAILED DESCRIPTION

A detailed description of one or more embodiments of the disclosed apparatus and method presented herein by way of exemplification and not limitation with reference to the figures.

Disclosed are embodiments of methods and apparatuses for producing an image of a subsurface formation. Specifically, the images are of surfaces that reflect seismic energy. The image produced has increased accuracy and clarity (i.e., increased signal to noise ratio) over images produced using prior art techniques. The images are produced using an improved normal moveout (NMO) correction methodology. Once the improved NMO correction methodology is implemented on seismic data, that seismic data can be further processed by applying other algorithms that result in more accurate and clear images resulting from those algorithms. Using the improved images, engineers and analysts can plan and implement operations on the imaged formation in order to efficiently use resources such as drilling resources and/or completion resources.

Figure 1:
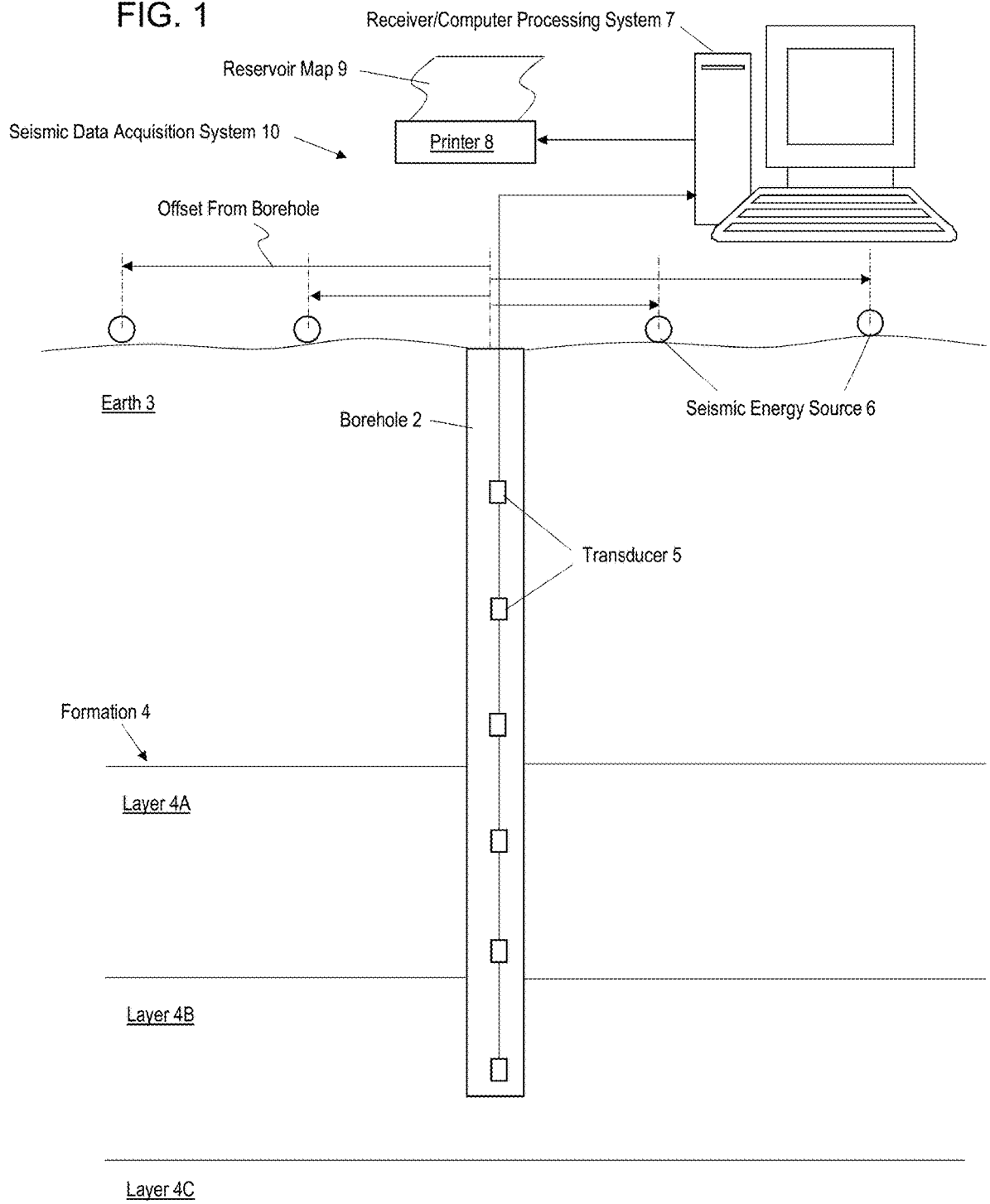
FIG. 1 is a cross-sectional view of an embodiment of a seismic data acquisition system.

Next, apparatus for implementing the disclosure herein are discussed. FIG. 1 is a cross-sectional view of a seismic data acquisition system 10 configured to perform a vertical seismic profile survey to obtain vertical seismic profile data. The seismic data acquisition system 10 includes one or more seismic energy sources 6 configured to inject seismic energy into the earth 3. In one or more embodiments, each seismic energy source is an air gun. Disposed in a borehole 2 penetrating the earth 3 are one or more transducers 5 configured to receive and measure the injected seismic energy such as by measuring the amplitude of one or more waves of the received seismic. The borehole 2 may also be referred to as a well or wellbore. The earth 3 includes a formation 4, which has layers 4A, 4B and 4C. Each transducer 5, which may be referred to as a geophone, is configured to convert the measured seismic energy to a signal, such as an electrical signal, that is transmitted to a receiver 7 at the surface of the earth. In one or more embodiments, the receiver 7 is configured to record the received signal and thus the measured seismic energy. In one or more embodiments, the receiver 7 is a computer processing system configured to process the measured seismic energy in accordance with the seismic data processing methodology discussed below. The computer processing system 7 may include an output interface configured to provide input to a printer 8 configured to print a map or image 9 based on the seismic data processing methodology discussed below.

Seismic Data Processing Introduction

Similar to surface seismic, normal moveout (NMO) correction is a useful data processing step to produce a vertical seismic profile (VSP). VSP NMO correction is usually applied to VSP CDP (common depth point) transform and other applications such as estimating velocity below borehole receivers and regularizing/interpolating source points. Most of previously used VSP NMO correction methods are based on two-term isotropic hyperbolic formulation, which can cause significant errors for multiple layered and/or anisotropic velocity models. The term "anisotropic" relates to the formation material having a velocity of seismic energy that is dependent of the direction of measurement of the seismic energy. The methodology disclosed herein is developed to accurately and efficiently perform VSP anisotropic NMO correction for walkaway VSP (WVSP) or 3D (three-dimensional) VSP data. The Fomel and Stovas' NMO formulation, developed for surface seismic surveys, is adapted as disclosed herein to NMO correction in WVSP or 3D VSP data with large source offsets in anisotropic (VTI (vertical transverse isotropy)) layered velocity model. A global optimization algorithm referred to as simulated annealing (SA) issued to automatically and efficiently search for four unknown parameters in the adapted Fomel and Stovas' formulation. In the SA algorithm, a coherence coefficient of semblance analysis in common receiver gather is used as an object cost function. That is, after a correct NMO correction, a reflection event is flatly aligned and its coherent semblance-analysis coefficient is maximized. To compress/attenuate both coherent and incoherent noises in the upgoing reflection wavefield of VSP data, a three-step processing flow consisting of NMO correction, median filtering, and reverse NMO correction is utilized. Application of the disclosed new methodology using a field WVSP dataset is presented illustrating the corresponding benefits.

METHODOLOGY (1) VSP Anisotropic NMO Formulation

Figure 2:
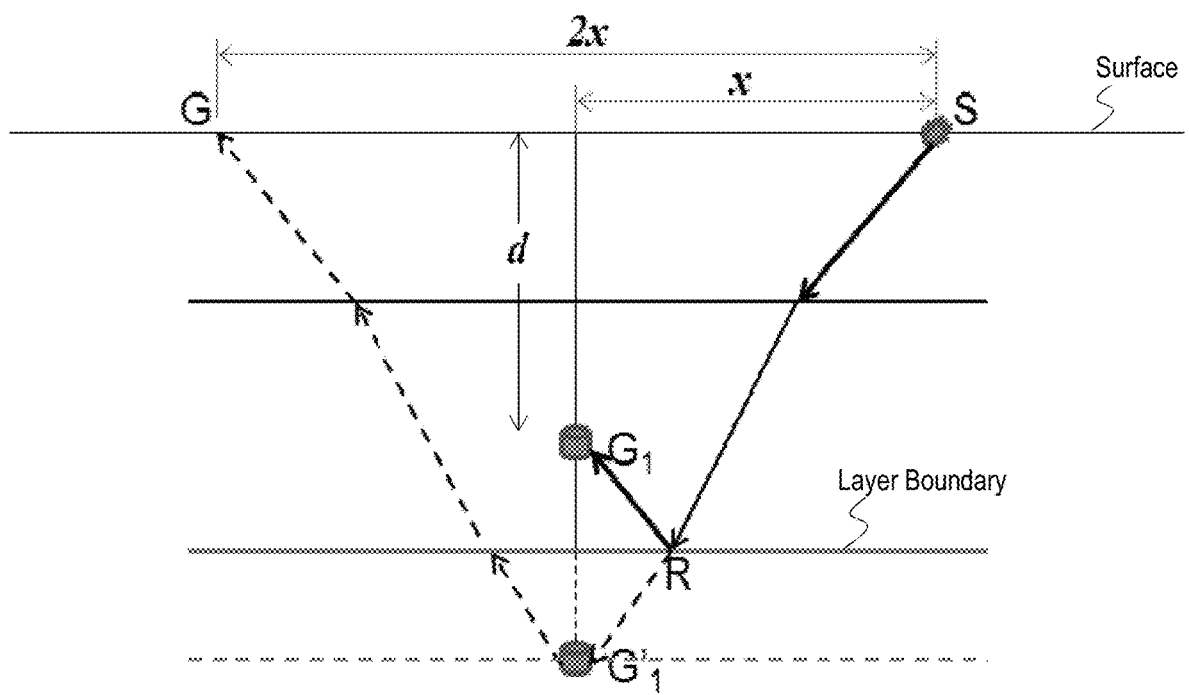
FIG. 2 depicts aspects of a seismic reflection event.

Previously developed NMO correction formulations for surface seismic surveys can be adapted to VSP survey geometry in a multiple layered model based on a mirror symmetric principle. As shown in FIG. 2, the ray path of reflection event from interface R recorded by borehole geophone $G_1$ in a VSP survey is equivalent to half of the symmetric ray path of a surface seismic primary reflection from a virtual interface located at $G_1'$ at which is a mirror position of geophone $G_1$ to the interface R. G represents a virtual geophone at the earth's surface. By replacing the surface seismic source S to geophone offset and the two-way vertical time in the surface reflection NMO approximation with the VSP source-wellhead offset and one-way vertical reflection time at a borehole geophone, any reflection NMO approximation developed for surface seismic surveys in multi-layered media can be adapted as a NMO formulation in common receiver domain for a WVSP and/or 3D VSP survey.

A simple and commonly-used approximation for VSP NMO correction is a two-term isotropic hyperbolic function sometimes used in surface seismic processing. However, as in surface seismic surveys, approximating VSP NMO times using a two-term hyperbolic function can cause significant errors for multiple layered and/or anisotropic velocity models. Alkhalifah developed a three-term non-hyperbolic NMO equation for multi-layered anisotropic models, which usually provides higher precision than the usual two-term hyperbolic function. Alkhalifah's equation is easily implemented in NMO correction and also useful to estimate both velocity and anisotropic parameter η. This formulation, however, is accurate only in approximating VSP NMO time for relatively short offset ranges and a small ratio of offset to reflector depth (<2) in multi-layered anisotropic media. Especially, relatively shallow reflection events can be severely distorted by using Alkhalifah NMO correction equation, as shown further below. Therefore, a generalized non-hyperbolic moveout function recently developed by Fomel and Stovas for surface seismic is adapted to approximate VSP NMO times:

$$t^2(x) = t_0^2 + \frac{x^2}{V^2} + \frac{Ax^4}{V^4\left(t_0^2 + B\frac{x^2}{V^2} + \sqrt{t_0^4 + 2Bt_0^2\frac{x^2}{V^2} + C\frac{x^4}{V^4}}\right)} \quad (1)$$

where x is source offset to wellhead, $t_0$ is one-way zero-offset vertical reflection time to a borehole receiver from a reflector, V is effective NMO velocity, and coefficients A, B, and C are terms linked to the velocity and anisotropic parameters of each layer in a multi-layered anisotropic model as well as some ray parameters (or travel time derivatives relative to offset x). In equation (1), the unknown parameters are V, A, B and C.

Equation (1) is accurate for a large offset range or a large ratio of offset to borehole receiver depth (>3) in any multi-layered anisotropic model, provided that the four unknowns are correctly determined. A major challenge in the application of equation (1) is to solve for its four unknown parameters. Most conventional methods such as dual-parameter linear scanning for such as Alkhalifah's function are no longer applicable or feasible due to the multiple parameter dimensions and the complexity of the four unknown parameters in equation (1). In the methodology disclosed herein, a global optimization method called simulated annealing is employed to accurately and efficiently solve for the four unknown parameters equation (1).

(2) Simulated Annealing Method

Simulated annealing (SA) is a non-linear inverse/search technique for locating the global optimum of a given object function in a large multi-parameter space. SA conceptually mimics the physical process of heating a solid until thermal stresses are released, slowly cooling to ambient temperature until perfect crystals emerge. SA attempts to optimize the object function while simultaneously moving parameters higher and lower, until a global optimum is reached. The major advantage of the SA technique is in the fact that it is a global optimal search procedure and therefore does not require a good initial model to obtain a quick convergence. As disclosed herein, an object function for SA is selected as being the maximum coherence coefficient of semblance analysis of NMO corrected and aligned reflection event within a time widow, defined as below.

(3) Coherence Coefficient of Semblance Analysis

The coherence coefficient of semblance analysis of a VSP NMO corrected reflection event in common receiver domain, is defined as:

$$CE = \frac{1}{M}\frac{\sum_{t}^{T}\left(\sum_{i=1}^{M}f_{i,t(i)}\right)^2}{\sum_{t}^{T}\sum_{i=1}^{M}f_{i,t(i)}^2} \quad (2)$$

where $f_{i,t(i)}$ is the amplitude value on the $i^{th}$ trace at NMO corrected time t(i), M is the number of traces in a common receiver gather, and T is the window length of semblance analysis. A common receiver gather is a group of seismic traces that share a receiver.

(4) Attenuating Noises Through VSP NMO Correction

The upgoing P-wave reflection wavefield is often contaminated by numerous residual wave modes such as P-S converted modes, refracted interface waves, and other random noise. Those coherent or incoherent noises can result in severe migration artifacts and therefore degrade the final imaging quality of VSP data. It can be beneficial to remove or attenuate those noises. To compress/attenuate noises, a three-step processing flow is utilized that includes NMO correction, median filtering, and reverse NMO correction. After applying VSP NMO correction, the primary reflection events are usually flatly aligned. Therefore, a median filter can be applied to attenuate/compress those unaligned coherent and incoherent noises. Finally, a reverse NMO correction to the median-filtered wavefield is employed for a final migration. The effectiveness of this noise-reduction application is illustrated in the following example section.

EXAMPLES

Figure 3:
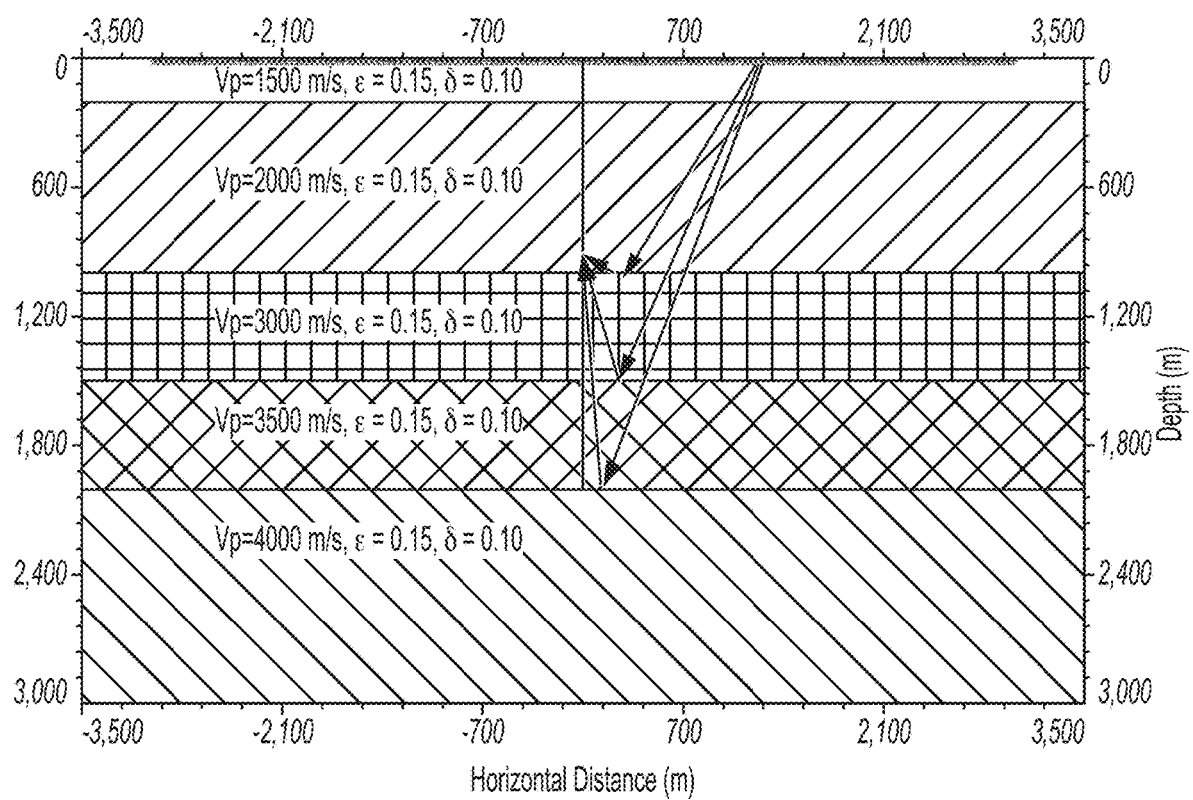
FIG. 3 depicts aspects of a multi-layered anisotropic formation model and a walkaway vertical seismic profile (VSP) survey geometry.
Figure 4A:
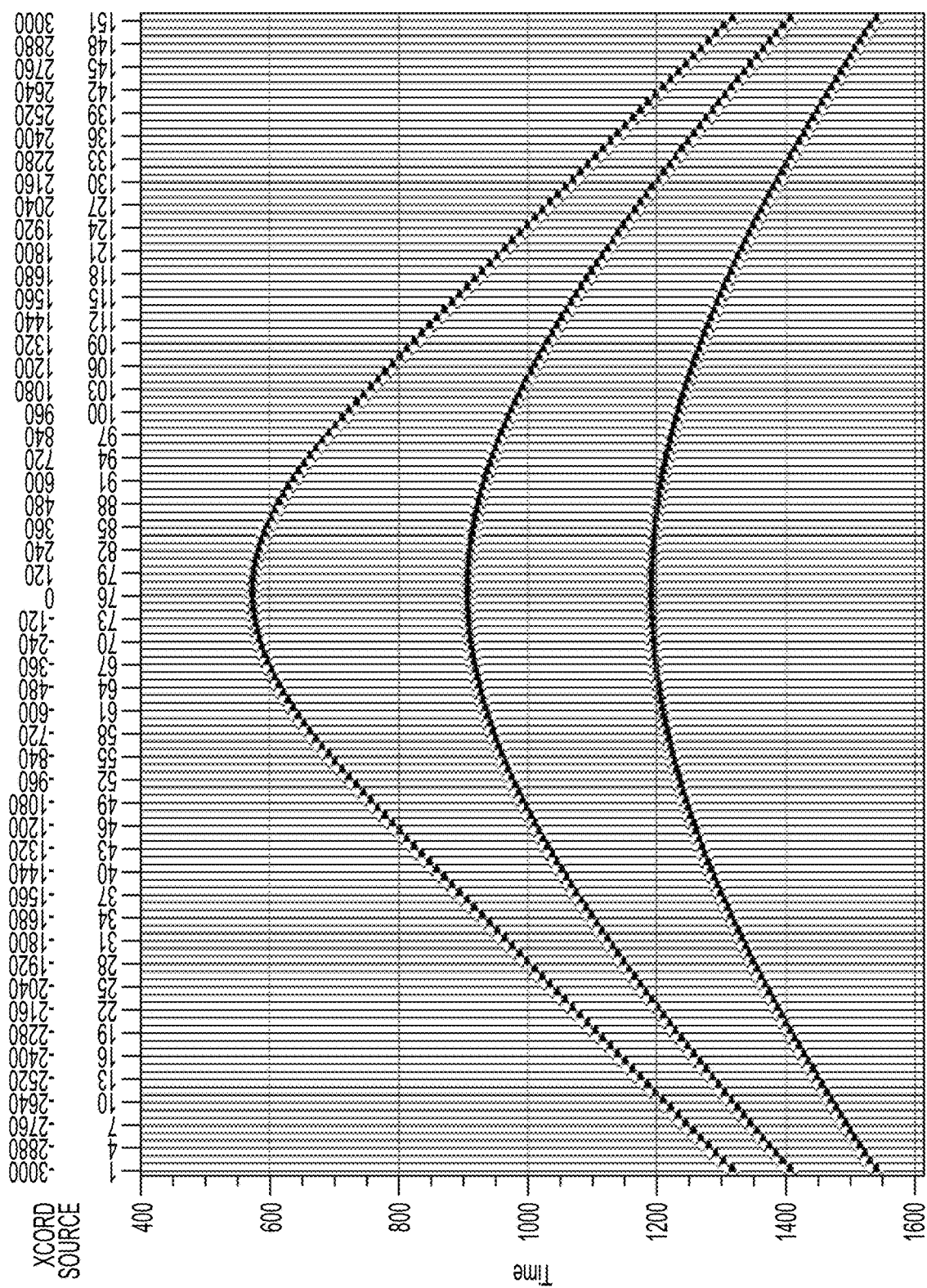
FIGS. 4A-4D, collectively referred to as FIG. 4, depict aspects of a common receiver gather of seismic data related to three reflection events generated from the multi-layered anisotropic formation model and various normal moveout (NMO) corrections.
Figure 4B:
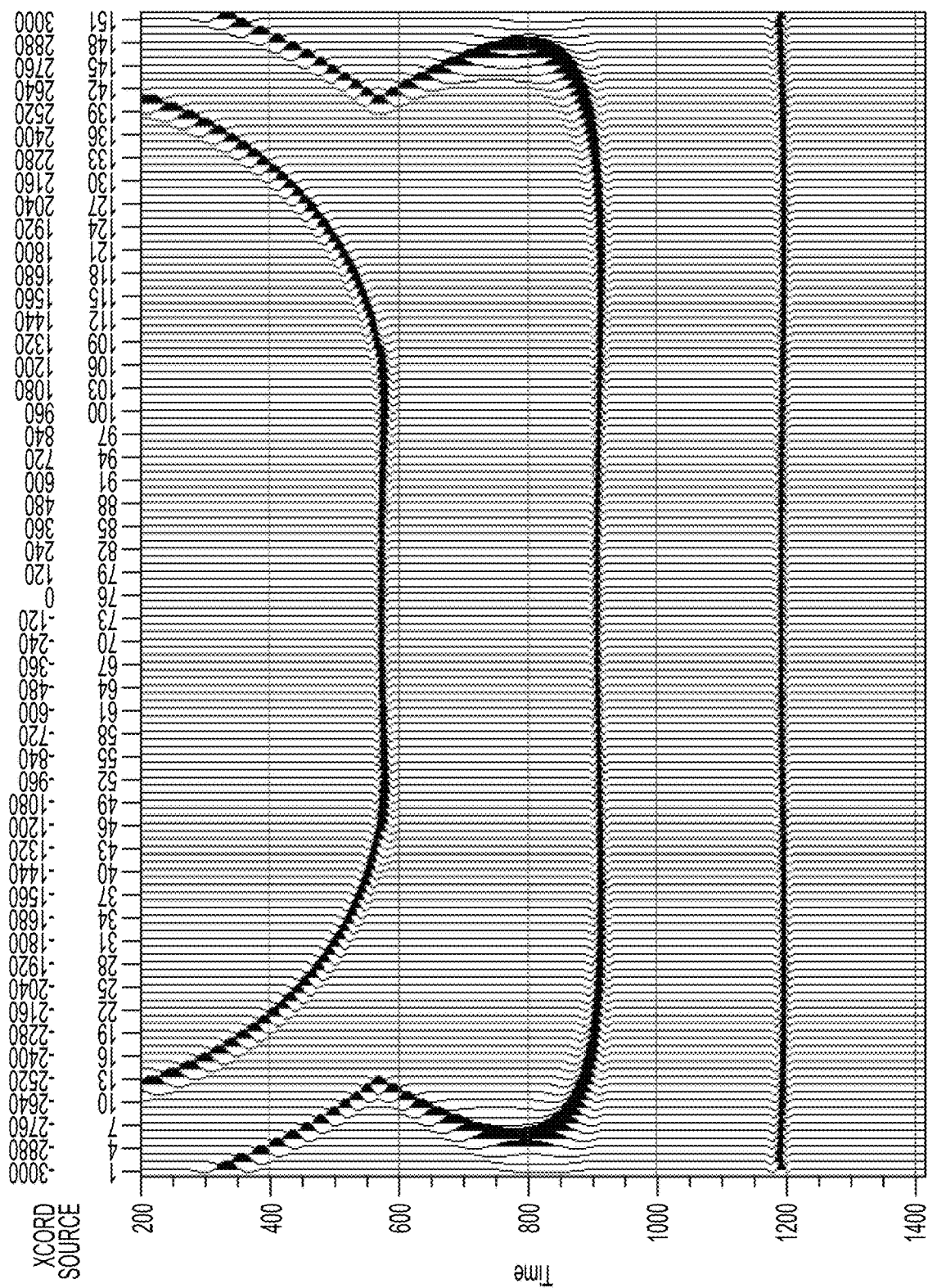
Figure 4C:
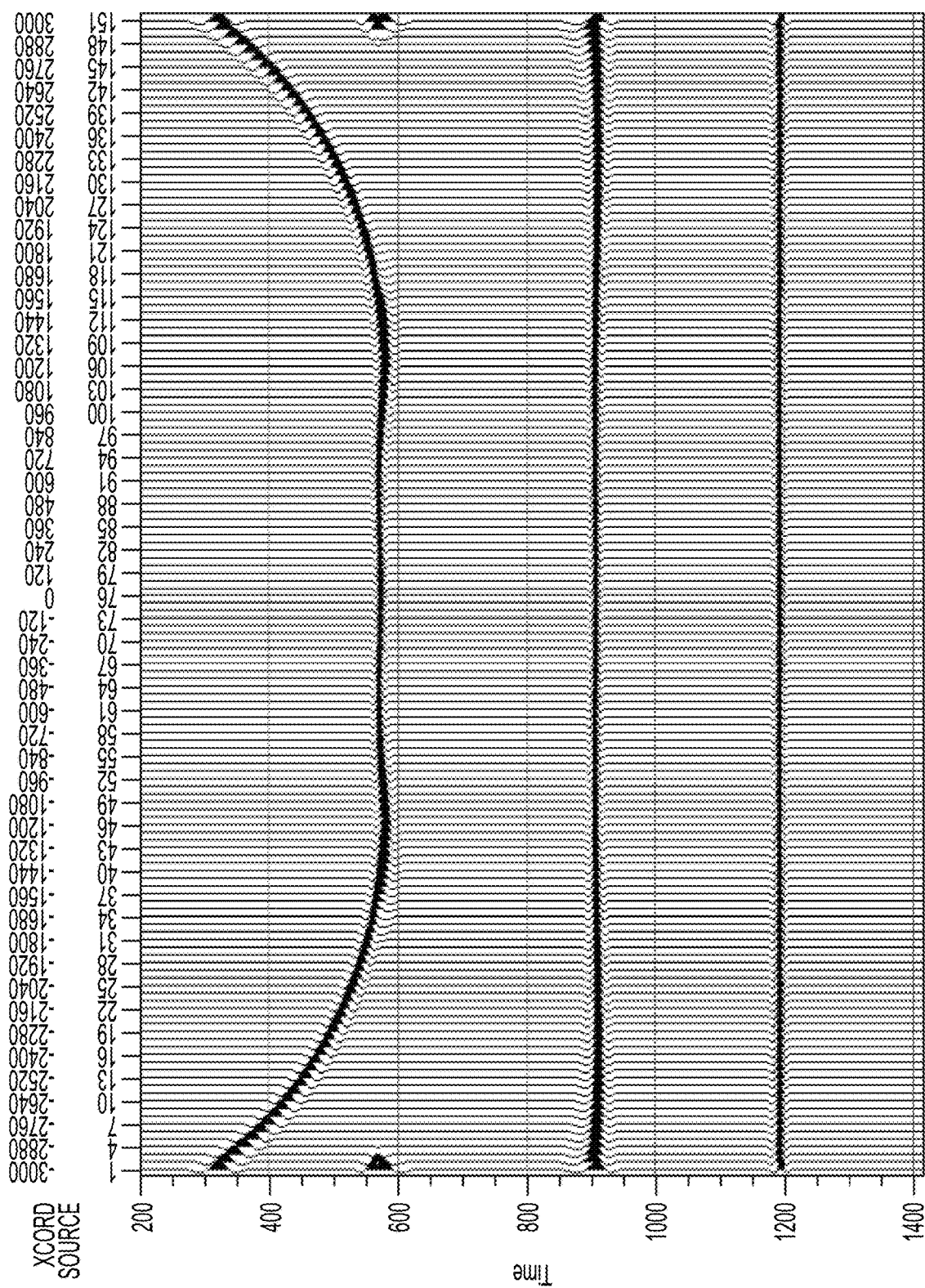
Figure 4D:
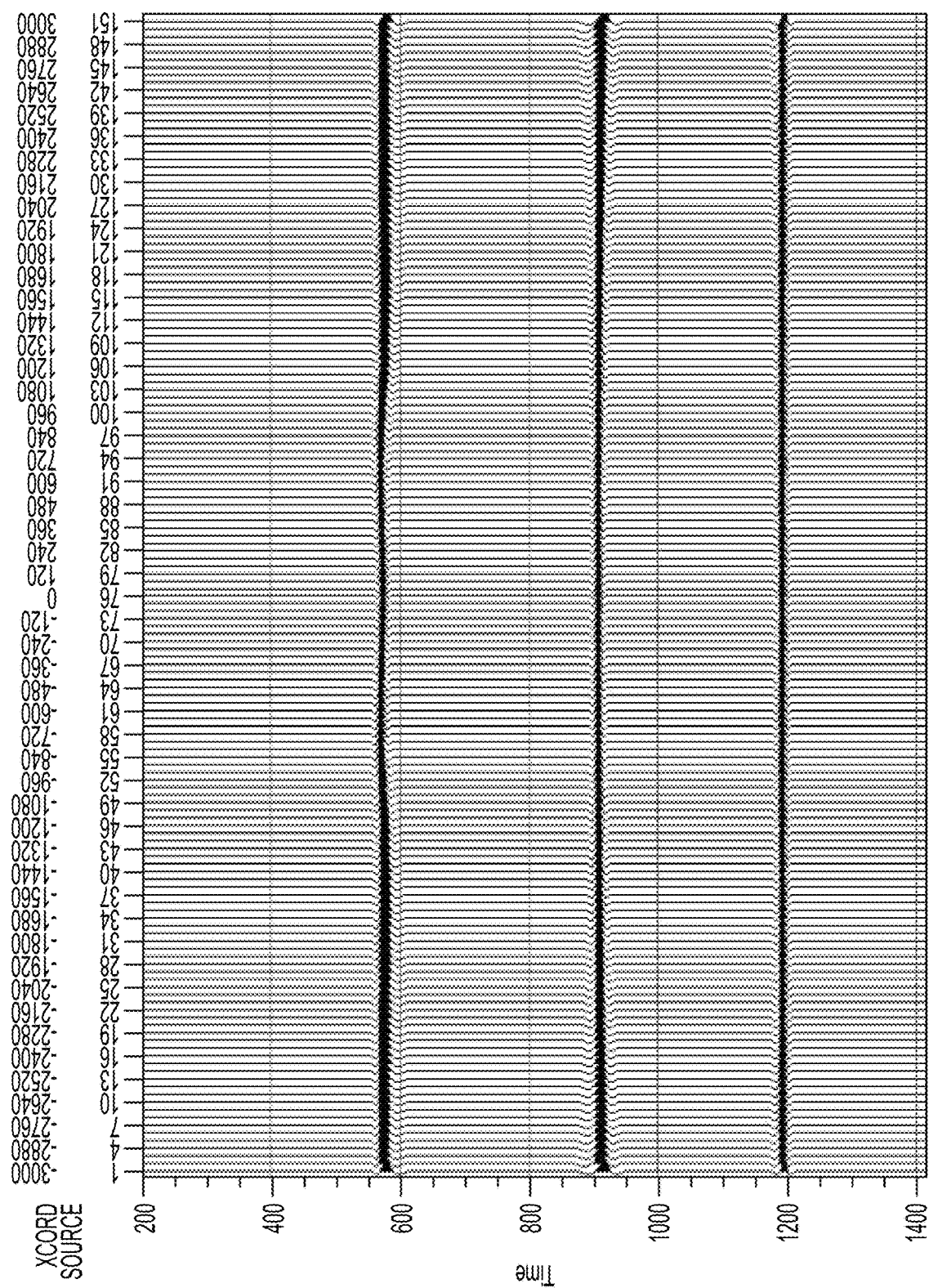

The VSP anisotropic NMO correction methodology is tested using a multi-layered anisotropic model as illustrated in FIG. 3. A relatively strong VTI anisotropy ($\varepsilon=0.15$ and $\delta=0.10$) is introduced to each of four layers in the model, where $\varepsilon$ and $\delta$ are two Thomsen's parameters characterizing VTI anisotropy in each layer. FIG. 4A illustrates the synthetic common-receiver gather of three reflection events received by a borehole receiver at depth 800 m for a WVSP survey with 151 surface sources with an inter-shot spacing of 40 meters offset from −3000 m to +3000 meters from the wellhead. If the conventional two-term isotropic hyperbolic formulation is used to perform VSP NMO correction, then, as FIG. 4B shows, the two shallow reflection events are severely distorted at offsets >1000 m and >2100 m, respectively. The Alkahalifah's formulation improves the NMO correction result, but the first shallow reflection event is still radically twisted at offsets >1400 m (see FIG. 4C). Using the adapted Fomal and Stovas' formulation and the methodology disclosed herein, all three reflection events are rightly corrected and aligned at the long offsets to 3000 m, as demonstrated by FIG. 4D.

Figure 5:
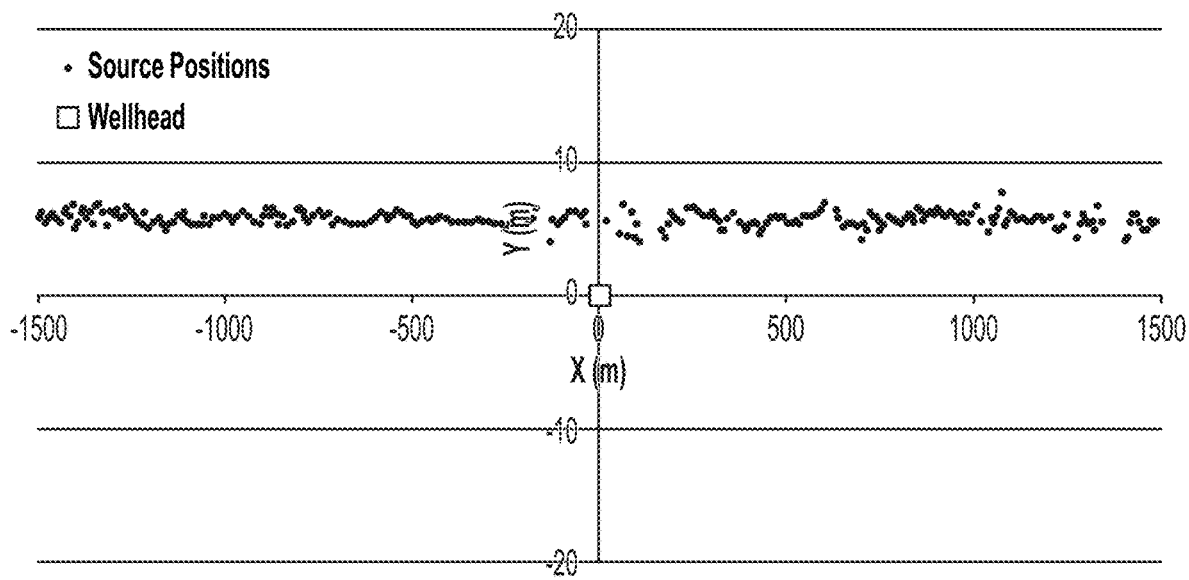
FIG. 5 depicts aspects of walkaway VSP survey geometry.
Figure 6:
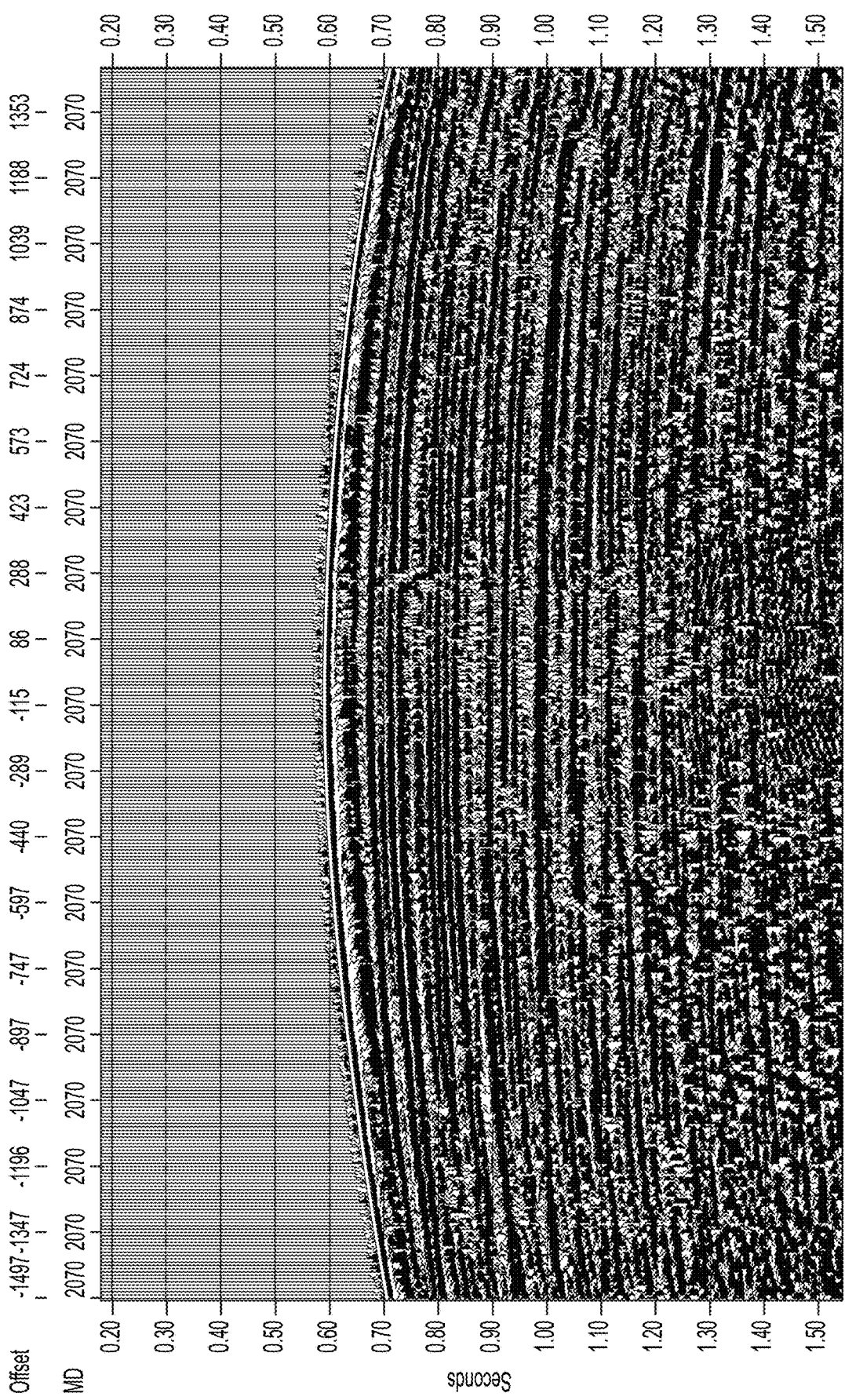
FIG. 6 depicts aspects of an upgoing reflection wavefield in a common receiver gather.
Figure 7A:
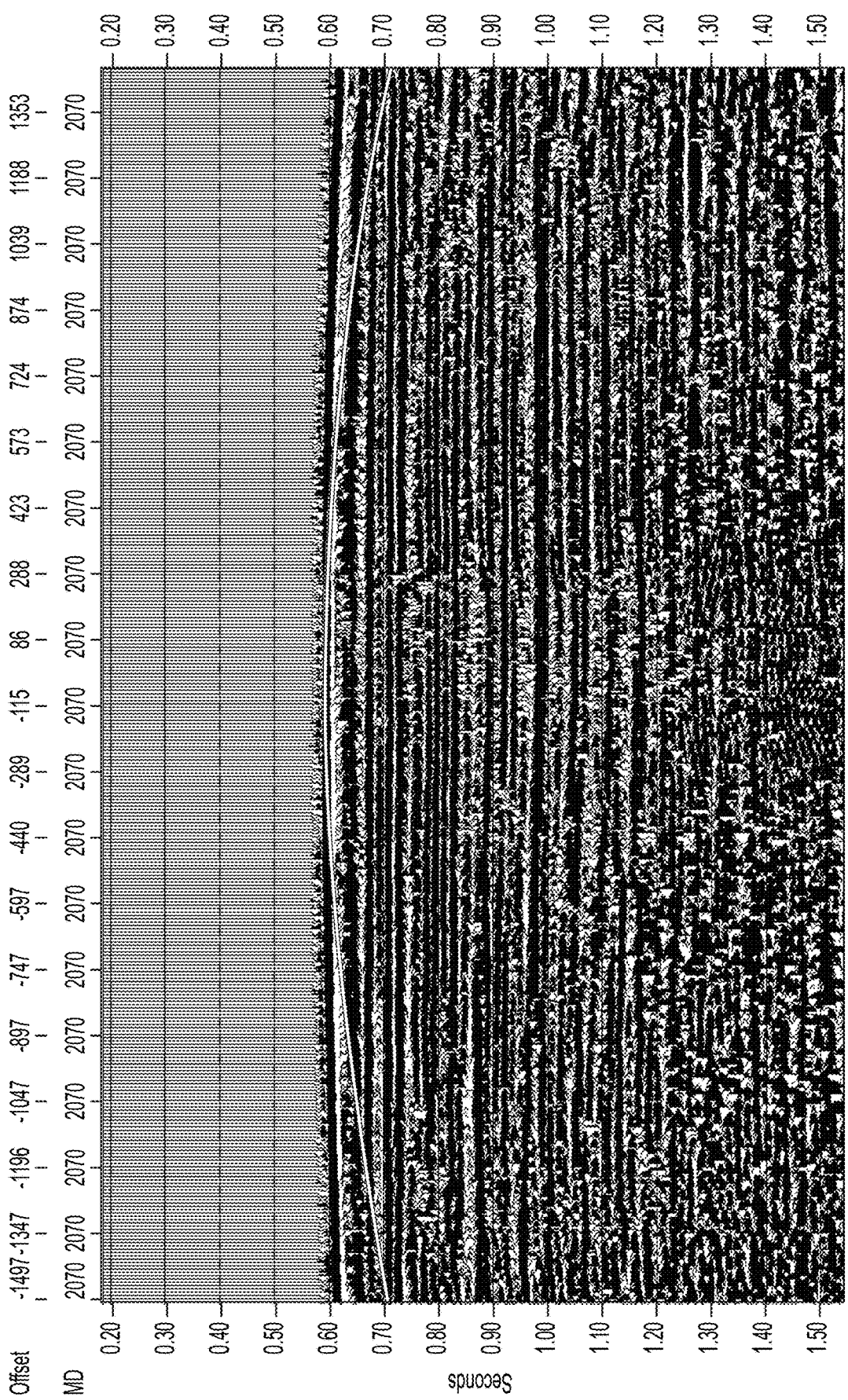
FIGS. 7A-7C, collectively referred to as FIG. 7, depict aspects of applying anisotropic NMO correction, median filtering to NMO corrected seismic data and a reverse NMO correction to the median filtered data.
Figure 7B:
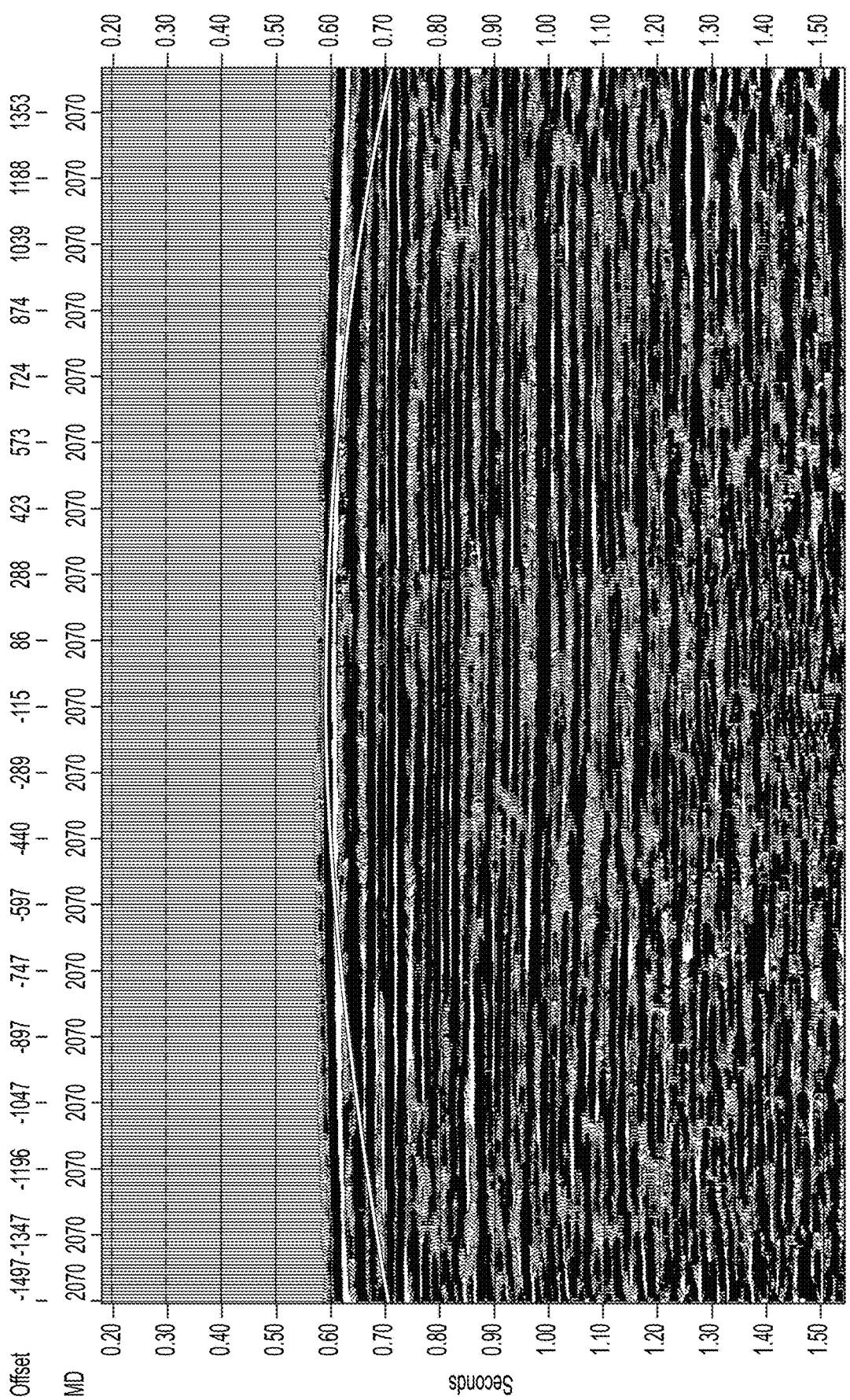
Figure 7C:
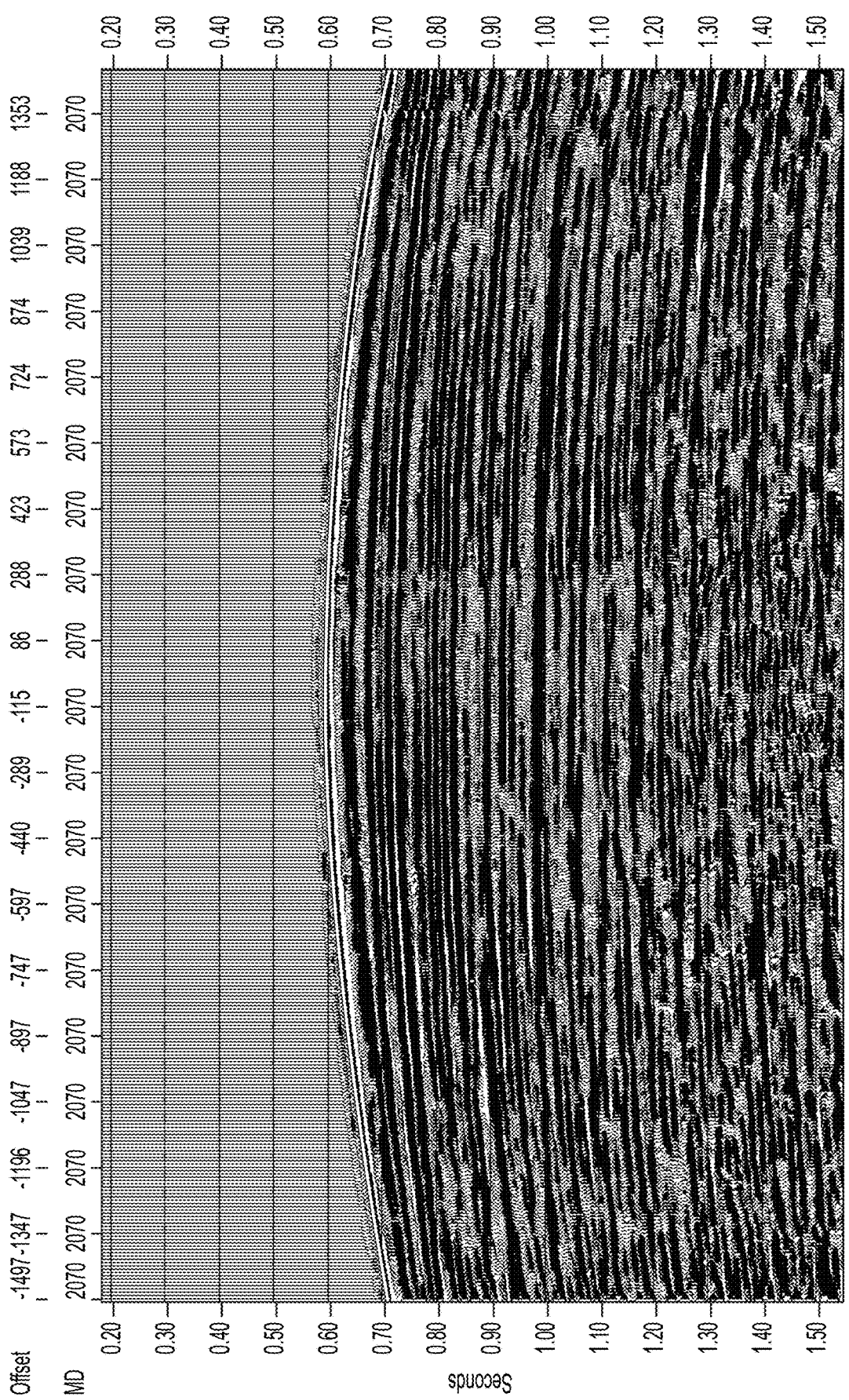
Figure 8A:
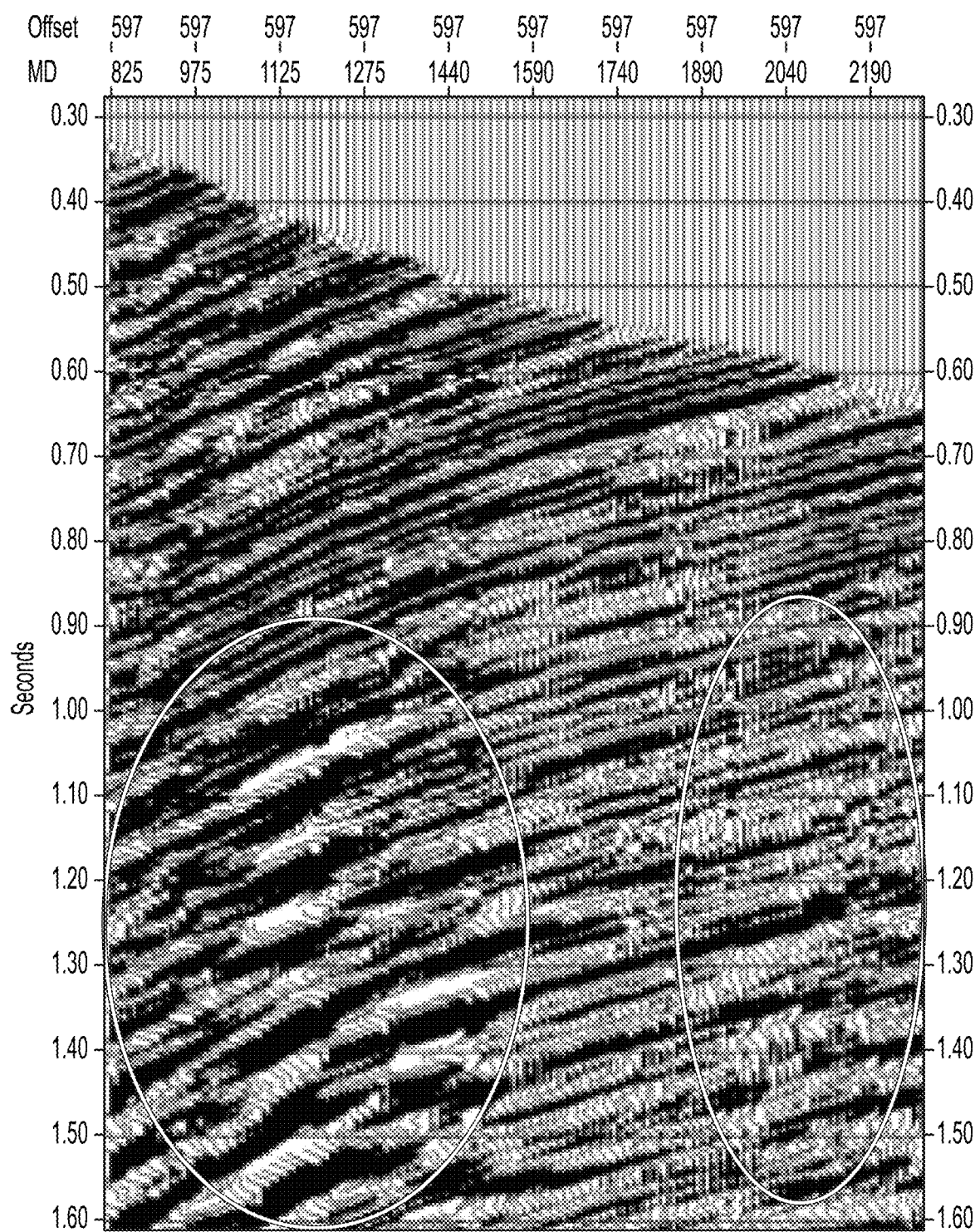
FIGS. 8A and 8B, collectively referred to as FIG. 8, depict aspects of a common-shot gather of P-wave reflection data before and after attenuating noises using NMO correction and median filtering methodology.
Figure 8B:
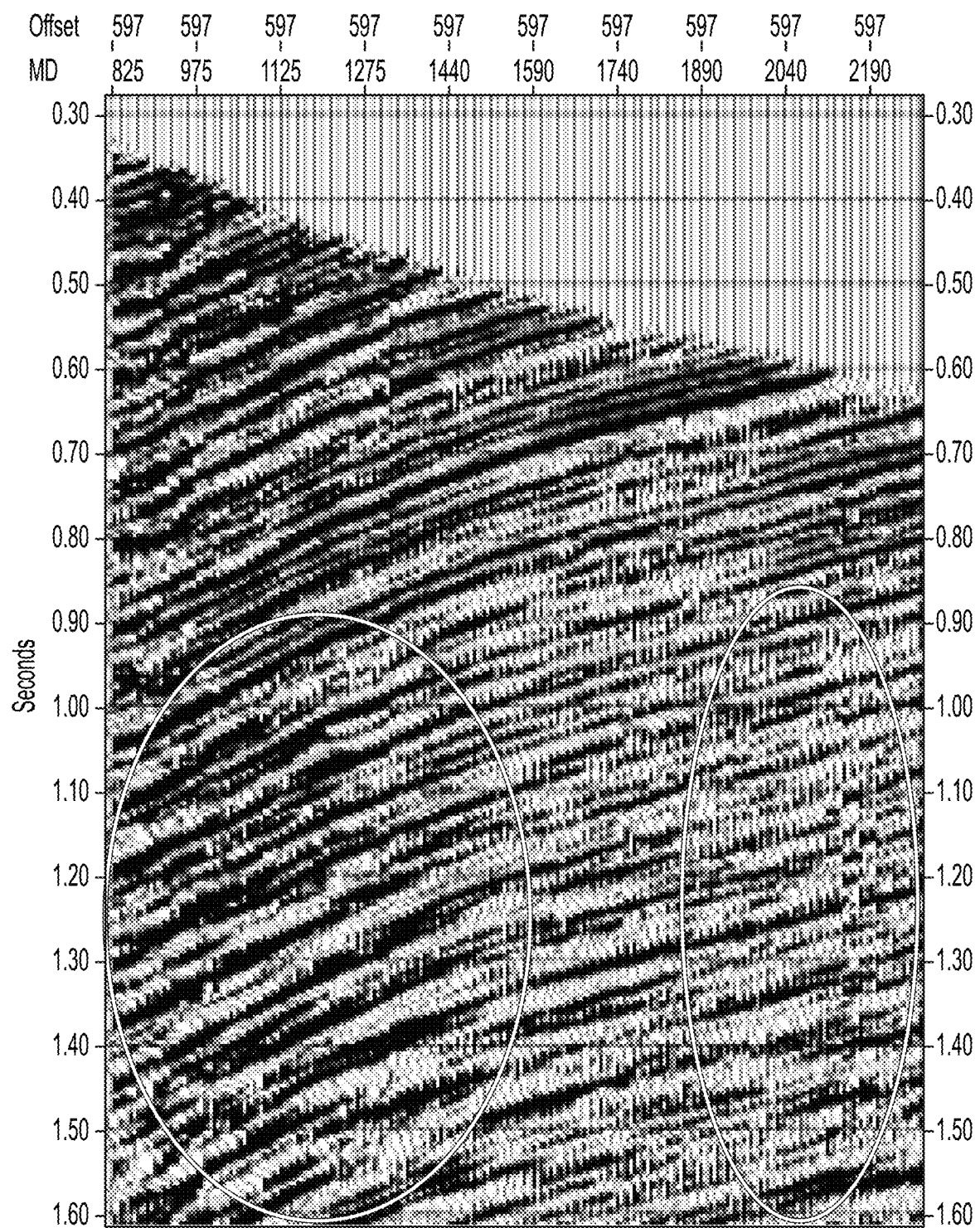
Figure 9A:
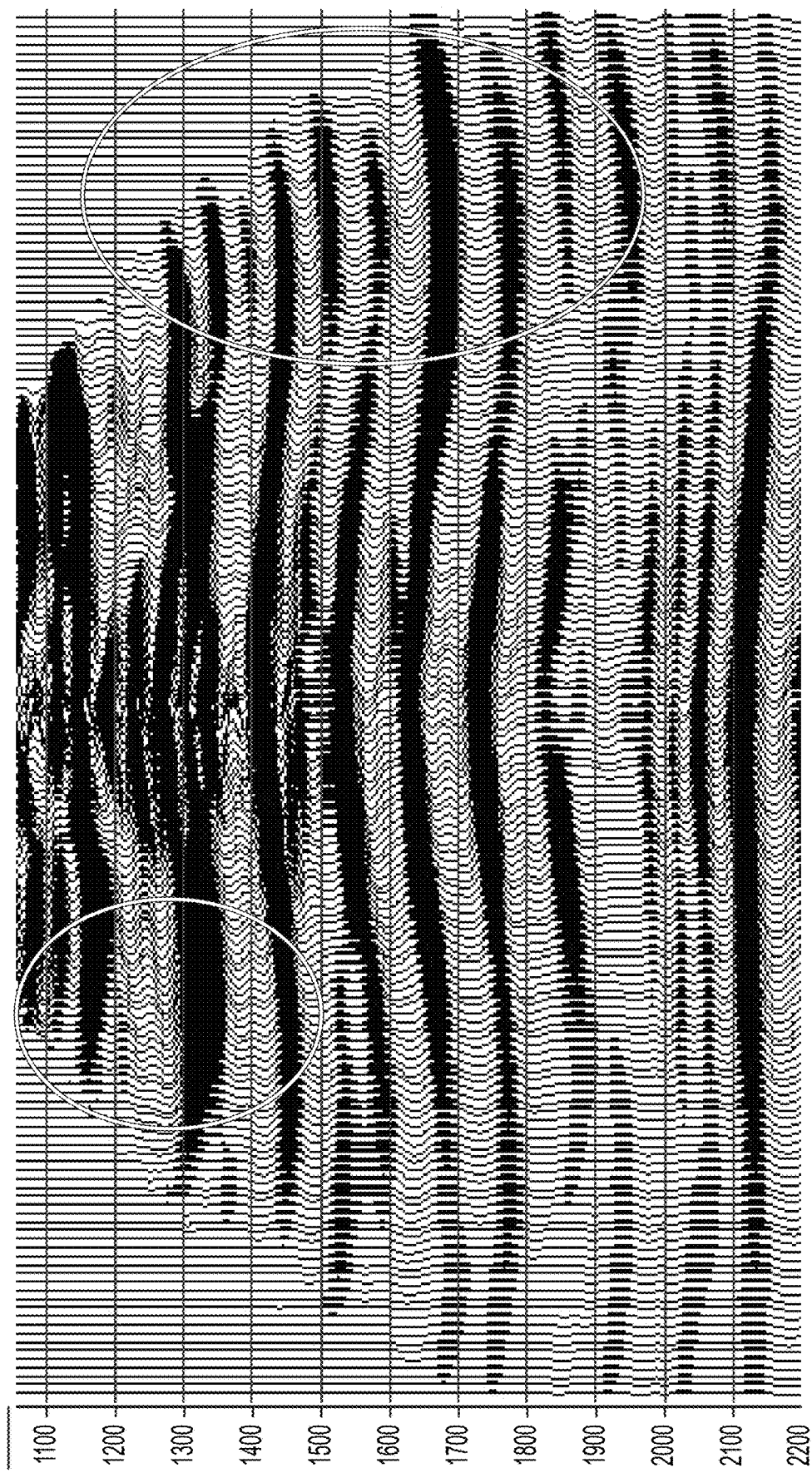
FIGS. 9A and 9B, collectively referred to as FIG. 9, depict aspects of Kirchhoff migration result of walkaway VSP data without and with attenuating noises NMO correction and median filtering methodology.
Figure 9B:
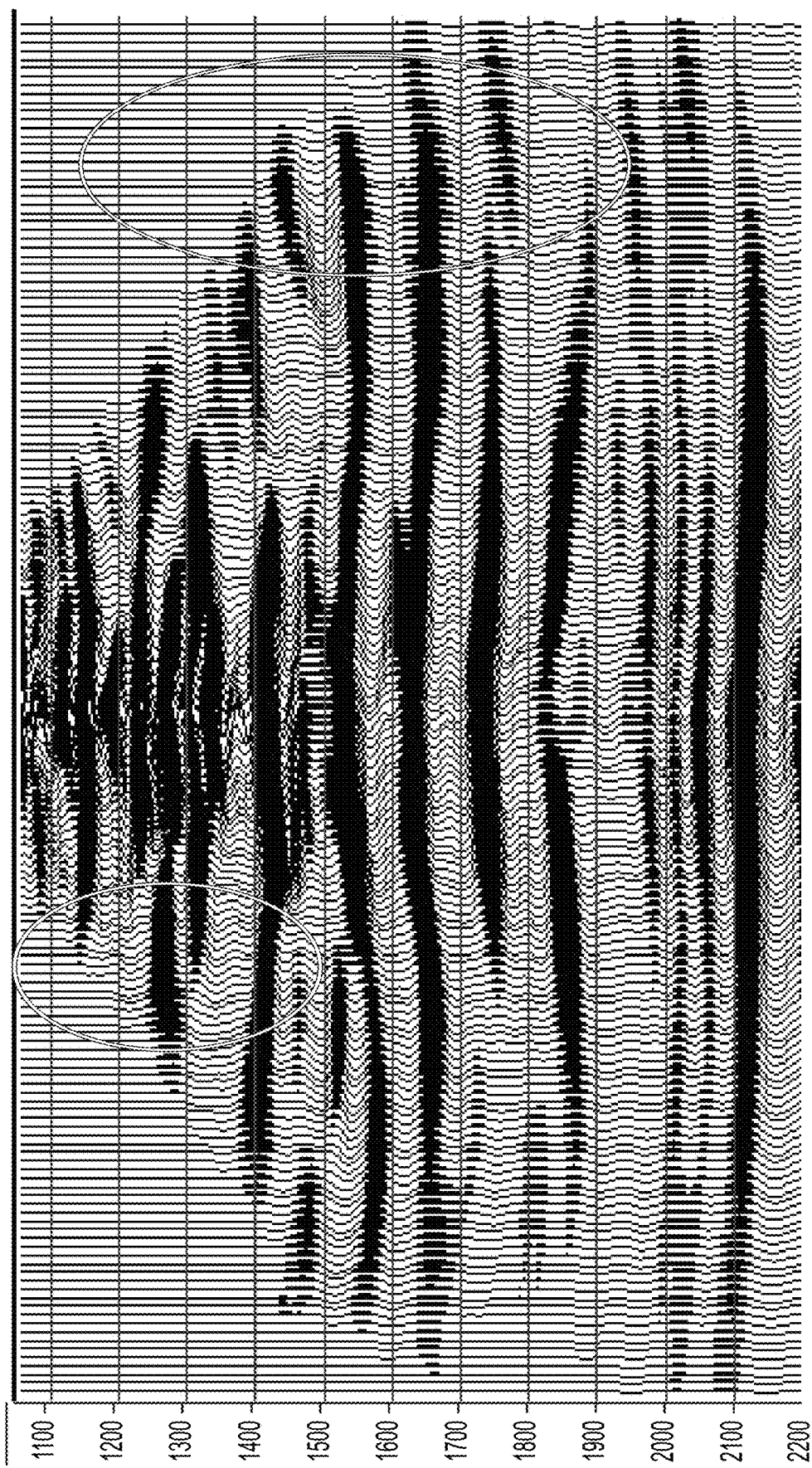

Next, the VSP anisotropic NMO correction methodology disclosed herein is applied to a land WVSP field dataset. The survey geometry is shown in a top view (i.e., looking down on the earth) in FIG. 5. There are a total of 360 shots with approximately 8 m shot interval covering offsets from −1500 m to +1500 m. There are 90 receivers at 15 m spacing positioned in a nearly vertical well from depth 850 m to 2200 m. FIG. 6 illustrates the upgoing P-wave reflection wavefield in a common receiver gather at depth 2000 m after wavefield separation with parametric inversion. Using the VSP anisotropic NMO correction disclosed herein, the reflection events in FIG. 6 have been flatly aligned as shown in FIG. 7A. However, those noticeably coherent and incoherent noises residing in the separated upgoing reflection wavefield are not aligned. So a seven-point median filter to the NMO corrected receiver gather is employed to attenuate those unaligned noises. FIG. 7B displays the median-filtered result of the receiver gather of FIG. 7A and shows that the noises have been greatly attenuated. For the final migration of the WVSP data, the NMO-corrected and median-filtered reflection events are reverse-NMO corrected as illustrated in FIG. 7C. As outlined by ovals in FIG. 8, the attenuation of the noises are more distinctly demonstrated in a common shot gather, where the residual P-S converted waves and other modes have been largely compressed after the NMO-correction and the median filtering. FIGS. 8A and 8B illustrate the common shot gather before and after noise attenuation, respectively. Finally, FIG. 9 illustrates a Kirchhoff migration result of the walkaway VSP data without (FIG. 9A) and with (FIG. 9B) the noise attenuation. The ovals in FIG. 9 highlight the zones where the migration artifacts caused by P-S converted modes and other noises have been greatly mitigated. The field data example suggests that the disclosed NMO-correction and median filtering processing methodology can significantly improve the image quality of the VSP data.

Applications

The results of applying the methodology disclosed herein to VSP data can be presented to a user in various forms. For example, a map or a formation or reservoir image can be printed using a printer or it can be displayed on a display or monitor. Using the map, a petro-engineer or analyst can plan and conduct operations related to the imaged reservoir. For example, a location and/or trajectory of a wellbore can be determined using the map. For another example, if a well is partially drilled, the remainder of the well can be drilled using a trajectory to access hydrocarbons in the formation based upon the map. Hence, drilling actions can be planned and conducted based upon information in the map. Other actions including completion actions can also be planned and conducted based upon information in the map. For example, locations of perforations of a casing lining the wellbore to provide a flow of hydrocarbons into the casing can be determined from information in the map.

FIG. 10 depicts aspects of a drilling system/completion system/stimulation system 99, which may be used to conduct a formation-related action. A drill rig 98 is configured to drill the borehole 2 into the earth 3 according to a desired trajectory or geometry. The drill rig 98 includes a drill string 96 and a drill bit 97 disposed at the distal end the drill string 96. The drill rig 98 is configured to rotate the drill string 96 and thus the drill bit 97 in order to drill the borehole 2. In addition, the drill rig 98 is configured to pump drilling mud (i.e., drill fluid) through the drill string 96 in order to lubricate the drill bit 97 and flush cuttings from the borehole 2. A geo-steering system 95 is coupled to the drill string 96 and is configured to steer the drill bit 97 in order to drill the borehole 2 according to the desired trajectory. A controller 92 is configured to control operations of the drill rig 98 to include controlling the geo-steering system 95. In one or more embodiments, the geo-steering system can control the direction of drilling by exerting a force on the borehole wall using extendable pads. The computer processing system 7 may provide inputs into the controller 92 based upon the user analyzing the reservoir map produced in accordance with the methodology disclosed herein. In the completion system embodiment, the drill string 96 represents a carrier (such as a wireline) for conveying a downhole tool represented by the drill bit 97 through the borehole 2. In one or more embodiments, the downhole tool is a perforation tool controlled by the controller 92 and configured to perforate a casing lining the borehole 2 at a selected depth or depth interval. In the stimulation system embodiment, the system is configured to open up existing fractures or create new fractures at a selected depth or depth interval such as by hydraulic fracturing in a non-limiting example. The controller 92 may also be configured to control operation of the completion system and/or stimulation system.

Figure 11:
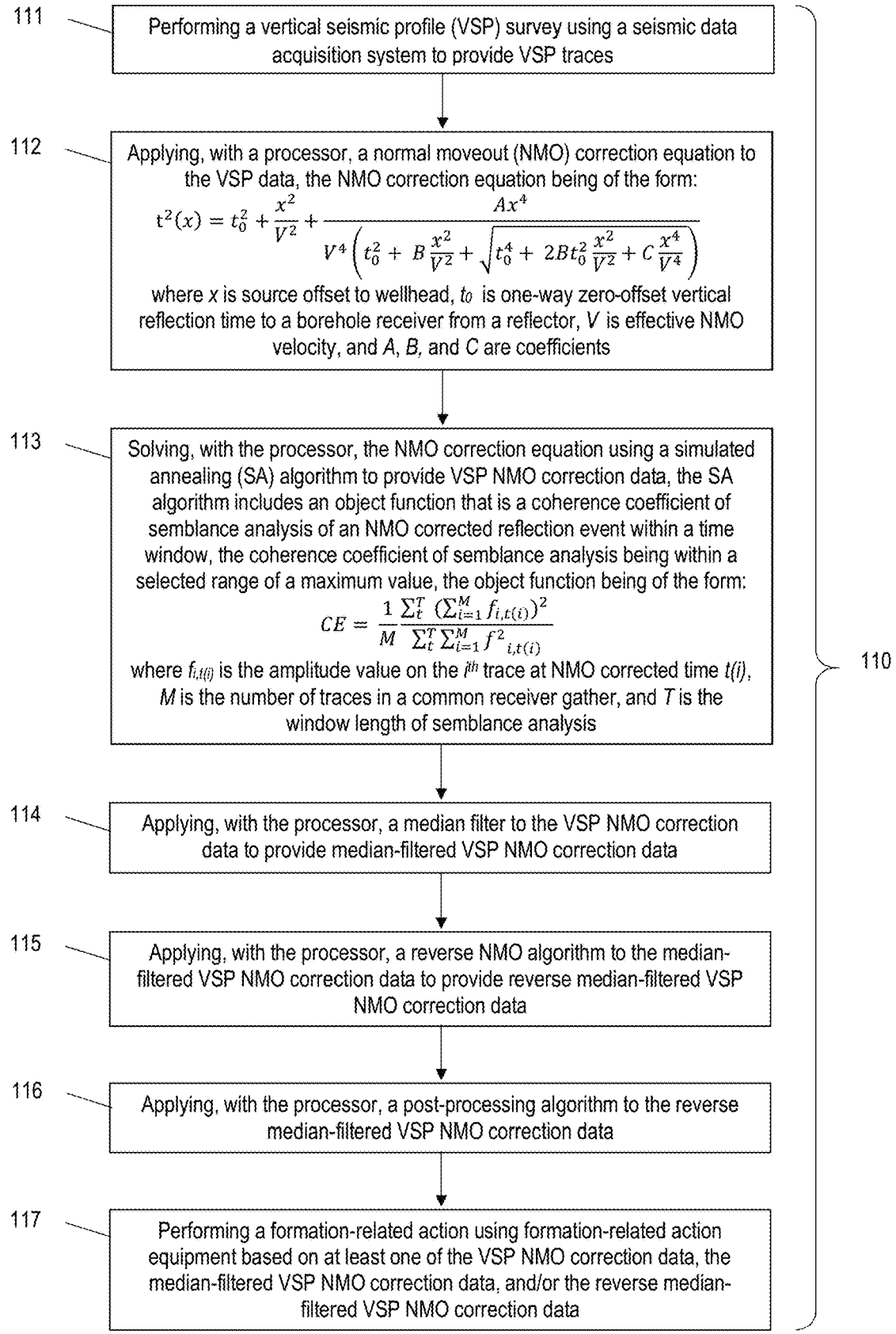
FIG. 11 is a flow chart for a method for producing an image of an earth formation.

FIG. 11 is a flow chart for a method 110 for performing a formation-related operation based on corrected vertical seismic profile (VSP) data of an earth formation. Block 111 calls for performing a vertical seismic profile (VSP) survey using a seismic data acquisition system to provide VSP data. In one or more embodiments, the VSP data includes VSP traces. Block 112 calls for applying, with a processor, a normal moveout (NMO) correction equation to the VSP data. The NMO correction equation is of the form:

$$t^2(x) = t_0^2 + \frac{x^2}{V^2} + \frac{Ax^4}{V^4\left(t_0^2 + B\frac{x^2}{V^2} + \sqrt{t_0^4 + 2Bt_0^2\frac{x^2}{V^2} + C\frac{x^4}{V^4}}\right)}$$

where t is time, x is source offset to wellhead, $t_0$ is one-way zero-offset vertical reflection time to a borehole receiver from a reflector, V is effective NMO velocity, and A, B, and C are coefficients. Block 113 calls for solving, with the processor, the NMO correction equation using a simulated annealing (SA) algorithm to provide VSP NMO corrected data, the SA algorithm includes an object function that is a coherence coefficient of semblance analysis of an NMO corrected reflection event within a time window, the coherence coefficient of semblance analysis being within a selected range of a maximum value. The coherence coefficient of semblance analysis is represented as $$CE = \frac{1}{M} \frac{\sum_{t}^{T} \left( \sum_{i=1}^{M} f_{i,t(i)} \right)^2}{\sum_{t}^{T} \sum_{i=1}^{M} f_{i,t(i)}^2}$$

where $f_{i,t(i)}$ is the amplitude value on the $i^{th}$ trace at NMO corrected time t(i), M is the number of traces in a common receiver gather, and T is the window length of semblance analysis. In one or more embodiments, the coherence coefficient of semblance analysis is the maximum value.

Block 114 calls for applying, with the processor, a median filter to the VSP NMO corrected data to provide median-filtered VSP NMO corrected data. Block 115 calls for applying, with the processor, a reverse NMO algorithm to the median-filtered VSP NMO corrected data to provide reverse median-filtered VSP NMO corrected data.

Block 116 calls for applying, with the processor, a post-processing algorithm to the reverse median-filtered VSP NMO corrected data. In one or more embodiments, the post-processing algorithm is a Kirchhoff migration.

Block 117 calls for performing a formation-related action using formation-related action equipment based on at least one of the VSP NMO corrected data, the median-filtered VSP NMO corrected data, and/or the reverse median-filtered VSP NMO corrected data. The phrase "based on at least one of the VSP NMO corrected data, the median-filtered VSP NMO corrected data, and/or the reverse median-filtered VSP NMO corrected data" may be inclusive of a printed or displayed image derived from the at least one of the VSP NMO corrected data, the median-filtered VSP NMO corrected data, and/or the reverse median-filtered VSP NMO corrected data. In one or more embodiments, the formation-related action is drilling a borehole at a location and/or according to a selected trajectory based upon the at least one of the VSP NMO corrected data, the median-filtered VSP NMO corrected data, and/or the reverse median-filtered VSP NMO corrected data. The location and/or trajectory may be selected to efficiently reach a reservoir of hydrocarbons. In one or more embodiments, the formation-related action is perforating a casing lining a borehole at a depth or depth interval using perforating tool based on at least one of the VSP NMO corrected data, the median-filtered VSP NMO corrected data, and/or the reverse median-filtered VSP NMO corrected data. The depth or depth interval for perforation may be selected to efficiently extract hydrocarbons from a reservoir. In one or more embodiments, the formation-related action is stimulating the formation, such as by hydraulic fracturing as a non-limiting example, at a depth or depth interval based on at least one of the VSP NMO corrected data, the median-filtered VSP NMO corrected data, and/or the reverse median-filtered VSP NMO corrected data. The depth or depth interval for stimulation may be selected to efficiently increase the permeability of the formation to efficiently extract hydrocarbons from a reservoir. In one or more embodiments, the term "efficiently" relates to saving time and/or money by performing the operation as close to the reservoir of hydrocarbons as possible or feasible.

Set forth below are some embodiments of the foregoing disclosure:

Embodiment 1

A method for performing a formation-related operation based on corrected vertical seismic profile (VSP) data of an earth formation, the method comprising: performing a VSP survey using a seismic data acquisition system to provide VSP data; applying, with a processor, a normal moveout (NMO) correction equation to the VSP data, the NMO correction equation comprising a form of:

$$t^2(x) = t_0^2 + \frac{x^2}{V^2} + \frac{Ax^4}{V^4 \left( t_0^2 + B\frac{x^2}{V^2} + \sqrt{t_0^4 + 2Bt_0^2 \frac{x^2}{V^2} + C\frac{x^4}{V^4}} \right)}$$

where t is time, x is source offset to wellhead, $t_0$ is one-way zero-offset vertical reflection time to a borehole receiver from a reflector, V is effective NMO velocity, and A, B, and C are coefficients; solving, with the processor, the NMO correction equation by using a simulated annealing (SA) algorithm to provide VSP NMO corrected data, the SA algorithm comprising a coherence coefficient of semblance analysis of an NMO corrected reflection event within a time window, the coherence coefficient of semblance analysis being within a selected range of a maximum value, the coherence coefficient of semblance analysis (CE) comprising a form of:

$$CE = \frac{1}{M} \frac{\sum_{t}^{T} \left( \sum_{i=1}^{M} f_{i,t(i)} \right)^2}{\sum_{t}^{T} \sum_{i=1}^{M} f_{i,t(i)}^2}$$

where $f_{i,t(t)}$ is an amplitude value on the $i^{th}$ trace at NMO corrected time t(i), M is a number of traces in a common receiver gather, and T is a window length of semblance analysis; and performing the formation-related operation at at least one of a location, a depth and a depth interval based on the VSP NMO corrected data.

Embodiment 2

The method according to any prior embodiment, wherein the coherence coefficient of semblance analysis is a maximum value.

Embodiment 3

The method according to any prior embodiment, wherein the formation-related operation comprises drilling a borehole using a drilling system according to a trajectory based on the VSP NMO corrected data.

Embodiment 4

The method according to any prior embodiment, wherein the formation-related operation comprises perforating a casing lining a borehole at a selected depth or depth interval using a perforation tool based on the VSP NMO corrected data.

Embodiment 5

The method according to any prior embodiment, wherein the formation-related operation comprises stimulating the earth formation to at least one or open up existing fractures and create new fractures at a selected depth or depth interval using a stimulation system based on the VSP NMO corrected data.

Embodiment 6

The method according to any prior embodiment, wherein the VSP NMO corrected data is presented as an image.

Embodiment 7

A method for performing a formation-related operation based on corrected vertical seismic profile (VSP) data of an earth formation, the method comprising: performing a VSP survey using a seismic data acquisition system to provide VSP data; applying, with a processor, a normal moveout (NMO) correction equation to the VSP data, the NMO correction equation comprising a form of:

$$t^2(x) = t_0^2 + \frac{x^2}{V^2} + \frac{Ax^4}{V^4\left(t_0^2 + B\frac{x^2}{V^2} + \sqrt{t_0^4 + 2Bt_0^2\frac{x^2}{V^2} + C\frac{x^4}{V^4}}\right)}$$

where t is time, x is source offset to wellhead, $t_0$ is one-way zero-offset vertical reflection time to a borehole receiver from a reflector, V is effective NMO velocity, and A, B, and C are coefficients; solving, with the processor, the NMO correction equation by using a simulated annealing (SA) algorithm to provide VSP NMO corrected data, the SA algorithm comprising a coherence coefficient of semblance analysis of an NMO corrected reflection event within a time window, the coherence coefficient of semblance analysis being within a selected range of a maximum value, the coherence coefficient of semblance analysis (CE) comprising a form of:

$$CE = \frac{1}{M} \frac{\sum_{t}^{T}\left(\sum_{i=1}^{M} f_{i,t(i)}\right)^2}{\sum_{t}^{T}\sum_{i=1}^{M} f_{i,t(i)}^2}$$

where $f_{i,t(i)}$ is an amplitude value on the $i^{th}$ trace at NMO corrected time t(i), M is a number of traces in a common receiver gather, and T is a window length of semblance analysis; applying, with the processor, a median filter to the VSP NMO corrected data to provide median-filtered VSP NMO corrected data that attenuates unaligned noises; and performing the formation-related operation at at least one of a location, a depth and a depth interval based on the median-filtered VSP NMO corrected data.

Embodiment 8

The method according to any prior embodiment, wherein the coherence coefficient of semblance analysis is a maximum value.

Embodiment 9

The method according to any prior embodiment, wherein the formation-related operation comprises drilling a borehole using a drilling system according to a trajectory based on the median-filtered VSP NMO corrected data.

Embodiment 10

The method according to any prior embodiment, wherein the formation-related operation comprises perforating a casing lining a borehole at a selected depth or depth interval based on the median-filtered VSP NMO corrected data.

Embodiment 11

The method according to any prior embodiment, wherein the formation-related operation comprises stimulating the earth formation to at least one or open up existing fractures and create new fractures at a selected depth or depth interval using a stimulation system based on the median-filtered VSP NMO corrected data.

Embodiment 12

The method according to any prior embodiment, wherein the median-filtered VSP NMO corrected data is presented as an image.

Embodiment 13

A method for performing a formation-related operation based on corrected vertical seismic profile (VSP) data of an earth formation, the method comprising: performing a VSP survey using a seismic data acquisition system to provide VSP data; applying, with a processor, a normal moveout (NMO) correction equation to the VSP data, the NMO correction equation comprising a form of:

$$t^2(x) = t_0^2 + \frac{x^2}{V^2} + \frac{Ax^4}{V^4\left(t_0^2 + B\frac{x^2}{V^2} + \sqrt{t_0^4 + 2Bt_0^2\frac{x^2}{V^2} + C\frac{x^4}{V^4}}\right)}$$

where t is time, x is source offset to wellhead, $t_0$ is one-way zero-offset vertical reflection time to a borehole receiver from a reflector, V is effective NMO velocity, and A, B, and C are coefficients; solving, with the processor, the NMO correction equation by using a simulated annealing (SA) algorithm to provide VSP NMO corrected data, the SA algorithm comprising a coherence coefficient of semblance analysis of an NMO corrected reflection event within a time window, the coherence coefficient of semblance analysis being within a selected range of a maximum value, the coherence coefficient of semblance analysis (CE) comprising a form of:

$$CE = \frac{1}{M} \frac{\sum_{t}^{T}\left(\sum_{i=1}^{M} f_{i,t(i)}\right)^2}{\sum_{t}^{T}\sum_{i=1}^{M} f_{i,t(i)}^2}$$

where $f_{i,t(t)}$ is an amplitude value on the $i^{th}$ trace at NMO corrected time t(i), M is a number of traces in a common receiver gather, and T is a window length of semblance analysis; applying, with the processor, a median filter to the VSP NMO corrected data to provide median-filtered VSP NMO corrected data that attenuates unaligned noises; applying, with the processor, a reverse NMO algorithm to the median-filtered VSP NMO corrected data to provide reverse median-filtered VSP NMO corrected data; and performing the formation-related operation at at least one of a location, a depth and a depth interval based on the reverse median-filtered VSP NMO corrected data.

Embodiment 14

The method according to any prior embodiment, wherein the coherence coefficient of semblance analysis is a maximum value.

Embodiment 15

The method according to any prior embodiment, wherein the formation-related operation comprises drilling a borehole using a drilling system according to a trajectory based on the reverse median-filtered VSP NMO corrected data.

Embodiment 16

The method according to any prior embodiment, wherein the formation-related operation comprises perforating a casing lining a borehole at a selected depth or depth interval based on the reverse median-filtered VSP NMO corrected data.

Embodiment 17

The method according to any prior embodiment, wherein the formation-related operation comprises stimulating the earth formation to at least one or open up existing fractures and create new fractures at a selected depth or depth interval using a stimulation system based on the reverse median-filtered VSP NMO corrected data.

Embodiment 18

The method according to any prior embodiment, wherein the reverse median-filtered VSP NMO corrected data is presented as an image.

Embodiment 19

The method according to any prior embodiment, further comprising applying a Kirchoff migration algorithm to the reverse median-filtered VSP NMO corrected data to provide Kirchoff migration VSP NMO corrected data.

Embodiment 20

The method according to any prior embodiment, wherein the formation-related operation is based on the Kirchoff migration VSP NMO corrected data.

In support of the teachings herein, various analysis components may be used, including a digital and/or an analog system. For example, the one or more transducers 5, the one or more seismic energy sources 6, the receiver/surface computer processing system 7, the controller 92 and/or the geo-steering system 95 may include digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

The disclosure illustratively disclosed herein may be practiced in the absence of any element which is not specifically disclosed herein.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for performing a physical formation-related operation based on corrected vertical seismic profile (VSP) data of an earth formation, the method comprising:
    performing a VSP survey using a seismic data acquisition system to provide VSP data;
    applying, with a processor, a normal moveout (NMO) correction equation to the VSP data;
    reducing noise in the VSP data by solving, with the processor, the NMO correction equation by using a simulated annealing (SA) algorithm to provide VSP NMO corrected data, the SA algorithm comprising a coherence coefficient of semblance analysis of an NMO corrected reflection event within a time window as a cost function in the SA algorithm; and
    performing the physical formation-related operation at at least one of a location, a first selected depth or a depth interval based on the VSP NMO corrected data, the physical formation-related operation comprising at least one of (i) drilling a borehole using a drilling system based on the VSP NMO corrected data, (ii) perforating a casing in the borehole at a second selected depth or depth interval based on the VSP NMO corrected data, or (iii) stimulating the earth formation to at least one of open up existing fractures or create new fractures at a third selected depth or depth interval based on the VSP NMO corrected data.

2. The method according to claim 1, wherein the coherence coefficient of semblance analysis is a maximum value.

3. The method according to claim 1, wherein the VSP NMO corrected data is presented as an image.

4. A method for performing a physical formation-related operation based on corrected vertical seismic profile (VSP) data of an earth formation, the method comprising:
    performing a VSP survey using a seismic data acquisition system to provide VSP data that includes reflection wave data;
    applying, with a processor, a normal moveout (NMO) correction equation to the VSP data inclusive of the reflection wave data;
    reducing noise in the VSP data by solving, with the processor, the NMO correction equation by using a simulated annealing (SA) algorithm to provide VSP NMO corrected data, the SA algorithm comprising a coherence coefficient of semblance analysis of an NMO corrected reflection event within a time window as a cost function in the SA algorithm;
    applying, with the processor, a median filter to the VSP NMO corrected data to provide median-filtered VSP NMO corrected data that attenuates unaligned noises; and
    performing the physical formation-related operation at at least one of a location, a first selected depth or a depth interval based on the median-filtered VSP NMO corrected data, the physical formation-related operation comprising at least one of (i) drilling a borehole using a drilling system based on the median-filtered VSP NMO corrected data, (ii) perforating a casing in the borehole at a second selected depth or depth interval based on the median-filtered VSP NMO corrected data, or (iii) stimulating the earth formation to at least one of open up existing fractures or create new fractures at a third selected depth or depth interval based on the median-filtered VSP NMO corrected data.

5. The method according to claim 4, wherein the coherence coefficient of semblance analysis is a maximum value.

6. The method according to claim 3, wherein the median-filtered VSP NMO corrected data is presented as an image.

7. A method for performing a physical formation-related operation based on corrected vertical seismic profile (VSP) data of an earth formation, the method comprising:
    performing a VSP survey using a seismic data acquisition system to provide VSP data that includes reflection wave data;
    applying, with a processor, a normal moveout (NMO) correction equation to the VSP;
    reducing noise in the VSP data that includes the reflection wave data by solving, with the processor, the NMO correction equation by using a simulated annealing (SA) algorithm to provide VSP NMO corrected data, the SA algorithm comprising a coherence coefficient of semblance analysis of an NMO corrected reflection event within a time window as a cost function in the SA algorithm;
    applying, with the processor, a median filter to the VSP NMO corrected data to provide median-filtered VSP NMO corrected data that attenuates unaligned noises;
    applying, with the processor, a reverse NMO algorithm to the median-filtered VSP NMO corrected data to provide reverse median-filtered VSP NMO corrected data; and
    performing the physical formation-related operation at at least one of a location, a first depth or a depth interval based on the reverse median-filtered VSP NMO corrected data, the physical formation-related operation comprising at least one of (i) drilling a borehole using a drilling system based on the reverse median-filtered VSP NMO corrected data, (ii) perforating a casing in the borehole at a second selected depth or depth interval based on the reverse median-filtered VSP NMO corrected data, or (iii) stimulating the earth formation to at least one of open up existing fractures or create new fractures at a third selected depth or depth interval based on the reverse median-filtered VSP NMO corrected data.

8. The method according to claim 7, wherein the coherence coefficient of semblance analysis is a maximum value.

9. The method according to claim 7, wherein the reverse median-filtered VSP NMO corrected data is presented as an image.

10. The method according to claim 7, further comprising applying a Kirchoff migration algorithm to the reverse median-filtered VSP NMO corrected data to provide Kirchoff migration VSP NMO corrected data.

11. The method according to claim 10, wherein the physical formation-related operation is based on the Kirchoff migration VSP NMO corrected data.

* * * * *